United States Patent [19]

Yoshida et al.

[11] Patent Number: 5,504,348

[45] Date of Patent: Apr. 2, 1996

[54] THIN-FILM TRANSISTOR ARRAY AND LIQUID CRYSTAL DISPLAY DEVICE USING THE THIN-FILM TRANSISTOR ARRAY

[75] Inventors: Mamoru Yoshida, Kunitachi; Makoto Sasaki, Tokyo; Hiroyuki Okimoto, Hino; Tsutomu Nomoto, Hachioji; Shunichi Sato, Kawagoe, all of Japan

[73] Assignees: Casio Computer Co., Ltd.; Oki Electric Industry Co., Ltd., both of Tokyo, Japan

[21] Appl. No.: 406,644

[22] Filed: Mar. 20, 1995

Related U.S. Application Data

[63] Continuation of Ser. No. 102,457, Aug. 5, 1993, abandoned.

[30] Foreign Application Priority Data

| Aug. 13, 1992 | [JP] | Japan | 4-215971 |
| Aug. 13, 1992 | [JP] | Japan | 4-215972 |
| Dec. 28, 1992 | [JP] | Japan | 4-347603 |
| Dec. 28, 1992 | [JP] | Japan | 4-347605 |
| Dec. 28, 1992 | [JP] | Japan | 4-347606 |

[51] Int. Cl.$^6$ .................................................. H01L 29/04
[52] U.S. Cl. .............................. 257/59; 257/363; 359/54; 359/59
[58] Field of Search ........................... 257/59, 57, 356, 257/363, 72; 359/59, 60, 54

[56] References Cited

U.S. PATENT DOCUMENTS

| 4,667,189 | 5/1987 | Den Boer et al. . | |
| 4,836,650 | 6/1989 | Morin et al. | 359/60 |
| 5,019,002 | 5/1991 | Holmberg | 257/355 |
| 5,053,347 | 10/1991 | Wu | 257/57 |
| 5,068,748 | 11/1991 | Ukai et al. | 257/59 |
| 5,081,687 | 1/1992 | Henley et al. | 382/8 |
| 5,184,235 | 2/1993 | Sukegawa | 359/60 |
| 5,200,876 | 4/1993 | Takeda et al. | 361/91 |
| 5,220,443 | 6/1993 | Noguchi | 257/356 |
| 5,233,448 | 8/1993 | Wu | 257/452 |
| 5,311,040 | 5/1994 | Hiramatsu et al. | 257/57 |

FOREIGN PATENT DOCUMENTS

| 0265290 | 4/1988 | European Pat. Off. . | |
| 0423824 | 4/1991 | European Pat. Off. . | |
| 59-166984 | 9/1984 | Japan . | |
| 62-156622 | 7/1987 | Japan | 359/60 |
| 62-219662 | 9/1987 | Japan . | |
| 3296725 | 12/1991 | Japan . | |
| WO90/00827 | 1/1990 | WIPO . | |

OTHER PUBLICATIONS

Conference Record of the 1985 International Display Research Conference, 1985, New York, pp. 76–79, Z. Yaniv et al, "Switching Device for Driving Active Matrix Liquid Crystal Dispays".

*Primary Examiner*—Sara W. Crane
*Assistant Examiner*—Courtney A. Bowers
*Attorney, Agent, or Firm*—Frishauf, Holtz, Goodman, Langer & Chick

[57] ABSTRACT

A thin film transistor array comprises an insulative substrate, a plurality of pixel electrodes arranged in a matrix on the insulative substrate, a plurality of thin film transistors connected respectively to the pixel electrodes, a plurality of address lines formed on the insulative substrate, each address line being connected to a plurality of control electrodes of the thin film transistors, and a plurality of data lines arranged on the insulative substrate in such a manner as to intersect the address lines, each data line being connected to a plurality of data input electrodes of the thin film transistors. A short-wiring is formed on the outside of a display region on the insulative substrate on which the pixel electrodes are arranged, and the short-wiring is connected to at least two of the address lines and the data lines by a two-terminal element having non-linear resistance characteristics defining voltage/current characteristics on the basis of a space charge limited current.

8 Claims, 22 Drawing Sheets

THIN-FILM TRANSISTOR ARRAY AND LIQUID CRYSTAL DISPLAY DEVICE USING THE THIN-FILM TRANSISTOR ARRAY

This application is a Continuation of application Ser. No. 08/102,457, filed Aug. 5, 1993, now abandoned.

BACKGROUND OF THE INVENTION

1. Field of the Invention

The present invention relates to a thin-film transistor array used in a liquid crystal display (LCD) device, in which display electrodes connected to thin-film transistors are arranged in a matrix, and an LCD apparatus using the thin-film transistor array.

2. Description of the Related Art

There has conventionally been known an active matrix type liquid crystal display device using a thin film transistor array (hereinafter referred to as "TFT-LCD") in which thin film transistors ("TFT") and pixel electrodes are arranged in a matrix.

An example of such a conventional TFT-LCD is disclosed in Jpn. Pat. Appln. KOKAI Publication No. 59-166984. FIG. 32 shows an equivalent circuit of the TFT array used in this TFT-LCD.

As is shown in FIG. 32, in the TFT array, address lines 2 and data lines 3 are arranged in rows and columns on a transparent insulating substrate 1 such that the address lines 2 intersect the data lines 3 at right angles. TFTs 4 having their gates connected to the address lines 2 and their drains connected to the data lines 3 are arranged in a matrix at the intersections of the address lines 2 and data lines 3. Pixel electrodes 5 connected to the sources of the TFTs 4 are arranged in a matrix. A short-wiring or short-ring 6 is formed on an outer peripheral portion of the transparent insulating substrate 1 along the outer periphery of the substrate 1. The data lines and address lines 3 electrically are connected to the short-wiring 6 via their terminal portions 2a and 3a.

After the processing of the TFT array is completed, the substrate 1 is cut along broken lines 7 shown in FIG. 32. Then, the substrate 1 is bonded to an opposed substrate having opposed electrodes with a predetermined gap therebetween, and a liquid crystal material is sealed between these substrates. Thus, an LCD device is formed.

In the manufacturing process of this TFT array, a DC static electricity occurs while the substrate is exposed to a plasma or subjected to a rubbing process. However, since all address lines 2 and data lines 3 are connected to the short-wiring 6, the potential of all address lines 2 and data lines 3 is equalized and it is possible to prevent a problem of dielectric breakdown or short-circuit due to a discharge of static electricity between electrodes.

However, in the manufacturing process of the conventional LCD device using the TFT array, the TFT array is bonded to an opposed substrate via a sealing member and then the short-wiring 6 is cut along broken lines 7 and removed. Thus, owing to static electricity occurring in the subsequent manufacturing steps of adhering a polarizing plate, connecting a driving circuit, etc., there may occur dielectric breakdown, line breakage, a characteristic variation of the TFTs, etc., resulting in a display defect in the LCD device. Consequently, a manufacturing yield may deteriorate.

FIG. 33 shows a structure for preventing dielectric breakdown, etc. due to static electricity in the LCD device after the TFT array is completed. A short-wiring 8 is formed between a display region, in which the pixel electrodes 5 connected to the TFTs 4 are arranged in a matrix, and a terminal array section in which the terminal portions 3a of data lines 3 and the terminal portions 2a of address lines 2 are arranged, such that the short-wiring 8 surrounds the display region. The short-wiring 8 is connected to the data lines 3 and address lines 2 by protection elements 9 each comprising a plurality of diodes designed to have non-linear current-voltage characteristics, as shown in FIG. 34.

In the TFT array having the protection elements 9, the protection elements 9 are turned on if static electricity occurs after the short-wiring 6 shown in FIG. 32 is cut and a high voltage is applied between the short-wiring 6 and the data lines 3 and address lines 2. As a result, a voltage difference between the data lines 3 and address lines 2 is eliminated, and dielectric breakdown between the data lines 3 and address lines 2 can be prevented.

The structure of the above-described protection elements, however, is complex, and steps other than those for forming TFTs are required. Thus, the number of steps for manufacturing the TFT panel increases and the manufacturing yield of TFTs considerably deteriorates owing to the increased steps.

The conventional TFT panels shown in FIGS. 32 and 33 have a problem in that the TFT panel has a low electrostatic destruction preventing effect against pulsatile static electricity, which is applied when the TFT panel is handled by operators, when the TFT panel is put in contact with an electrified manufacturing apparatus, when the rubbing roller approaches the substrate, or when the substrate is cut, at which time most of electrostatic destruction occurs.

Furthermore, in the TFT panel having the protection elements shown in FIG. 32, a leak current flows between the address lines 2 and data lines 3 via the protection elements 9. Thus, much crosstalk occurs, the display quality deteriorates and much current is consumed.

SUMMARY OF THE INVENTION

The object of the present invention is to provide a thin film transistor array capable of reducing the possibility of the aforementioned display defect due to static electricity of a liquid crystal display device, increasing the yield, and decreasing power consumption with easy manufacturing, and to provide a liquid crystal display device using the thin film transistor array.

In order to achieve this object, there is provided a TFT array comprising: a plurality of pixel electrodes arranged in a matrix on an insulative substrate; a plurality of thin film transistors connected respectively to the pixel electrodes; a plurality of address lines connected to a plurality of control electrodes of the thin film transistors; and a plurality of data lines arranged such a manner as to intersect the address lines, each data line being connected to a plurality of data input electrodes of the thin film transistors, wherein there are provided short-wiring formed on the outside of a display region on which the pixel electrodes are arranged, and a two-terminal element for connecting the short-wiring to at least two lines of the address lines and the data lines, the two-terminal element having non-linear resistance characteristics defining voltage/current characteristics on the basis of a space charge limited current.

According to this invention, the thin film non-linear resistor element can be fabricated during the process of manufacturing the thin film transistor (TFT), without providing any special manufacturing step. Thus, the two-terminal element for preventing electrostatic breakdown can be formed without increasing the number of manufacturing steps of the TFT panel. Accordingly, the manufacturing yield of the TFTs can be increased.

In the present invention, it is desirable that the thin film non-linear resistor element be a double-injection type thin film non-linear resistor element in which holes and electrons are injected as carriers, or an electron-injection type thin film non-linear resistor element in which electrons are injected as a carrier. The double-injection type thin film non-linear resistor element is formed by connecting electrodes to both ends of an impurity-non-doped hydrogenated amorphous silicon film formed on the insulative substrate. The electron-injection type thin film non-linear resistor element is formed by connecting electrodes to both ends of an impurity-non-doped hydrogenated amorphous silicon film formed on the insulative substrate via an n-type amorphous silicon film doped with n-type impurities.

According to another aspect of the invention, there is provided a TFT array comprising: a plurality of pixel electrodes arranged in a matrix on an insulative substrate; a plurality of thin film transistors connected respectively to the pixel electrodes; a plurality of address lines connected to a plurality of control electrodes of the thin film transistors; and a plurality of data lines arranged such a manner as to intersect the address lines, each data line being connected to a plurality of data input electrodes of the thin film transistors, wherein there are provided a plurality of electrically insulated short means formed on the outside of a display region on the insulative substrate on which the pixel electrodes are arranged, said short means being connected to at least two of the address lines and the data lines.

According to this invention, the address lines are not connected to the data lines via the short-wiring. Thus, a high potential is not applied across the address line and data line owing to pulse-like static electricity which occurs most frequently during the TFT manufacturing process, and electrostatic breakdown can be prevented.

The above invention may have a structure wherein the short means is formed outside the display region and inside the terminal arrangement section of the address and data lines, and the short means is a two-terminal element having non-linear resistance characteristics and is connected to the address and data lines. In this case, the two-terminal element as the short means may be connected between two or more address lines and two or more data lines. Furthermore, the short-wiring may be formed outside the terminal arrangement region of the address and data lines. The short-wiring may be a two-terminal element having non-linear resistance characteristics formed outside the display region and inside the terminal arrangement region, and the two-terminal element may comprise first short-wiring connected to the address and data lines and second short-wiring formed outside the terminal arrangement region. Moreover, the short-means may comprise the short-wiring formed outside the display region and inside the terminal arrangement region and an outside short-wiring formed outside the terminal arrangement region and connecting the address lines and data lines.

According to still another aspect of the invention, there is provided a liquid crystal display element which comprises the TFT array; a second insulative substrate opposed to a surface of the first insulative substrate, on which the TFT array is provided, with a liquid crystal layer of a predetermined thickness being interposed, the second insulative substrate having a surface provided with opposed electrodes opposed to the pixel electrodes; and potential supply means, connected electrically to the short means, for applying a predetermined potential to the short means.

According to the liquid crystal display device of the invention, the potential of the short means is set at a predetermined level, and therefore a leak current flowing via the terminal element decreases, the power consumption decreases, the crosstalk decreases, and the display quality is enhanced.

In this display device, it is desirable that the potential applied to the short means be substantially equal to a potential applied to the opposed electrodes, be substantially equal to a lowest potential of the data signal supplied to the data lines, or be a potential which is synchronized with an inverted cycle of the data signal supplied to the data lines and is inverted with the same potential and the same or opposite phase with reference to a potential applied to the opposed electrodes formed on the second substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will now be described in detail with reference to the accompanying drawings.

[First Embodiment]

Figure 1:
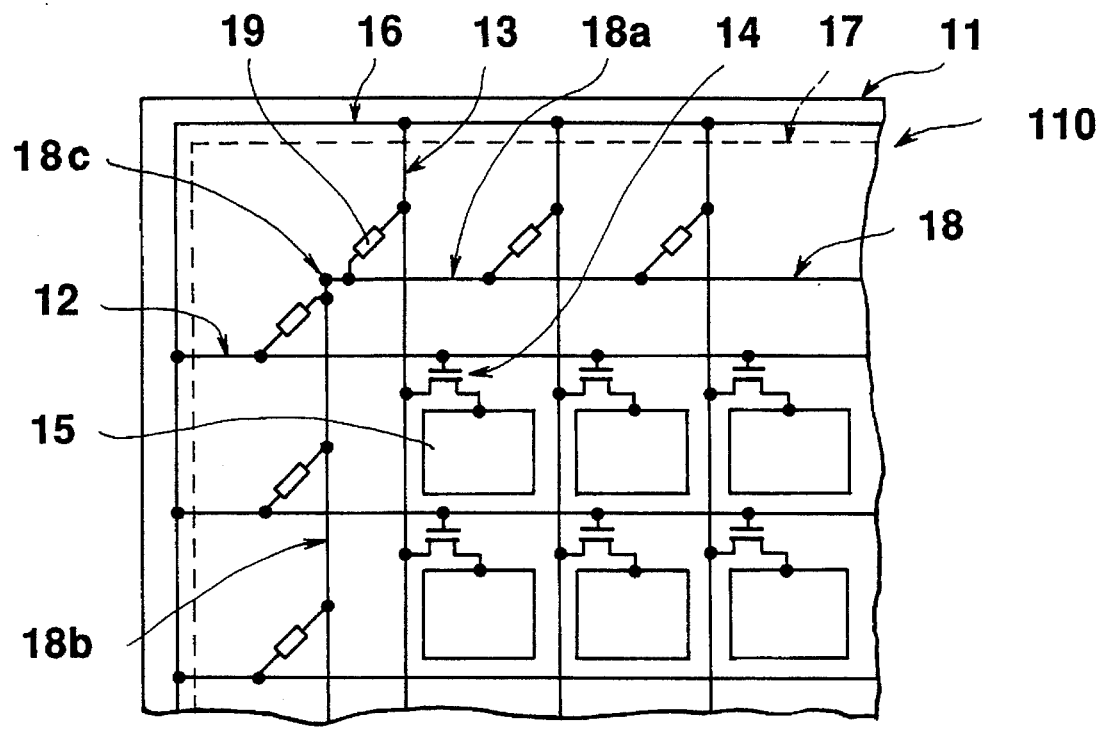
FIG. 1 is a plan view showing a TFT array according to a first embodiment of the present invention.
Figure 2:
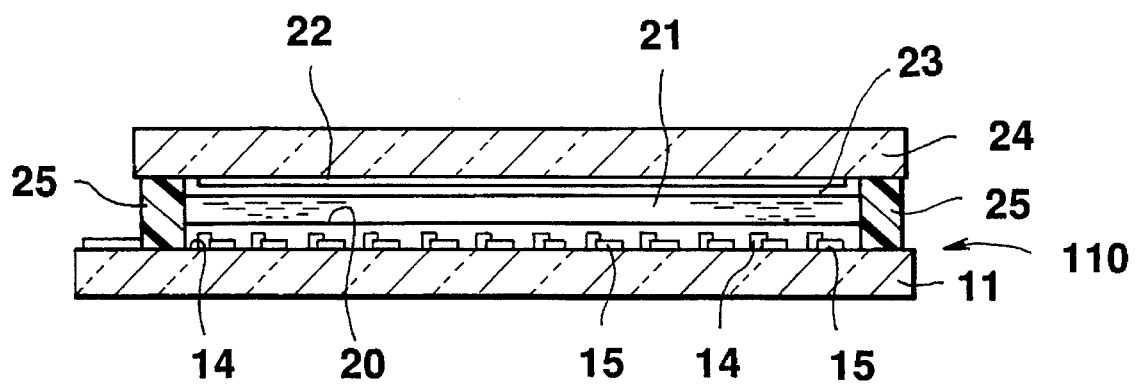
FIG. 2 is a cross-sectional view of a liquid crystal display (LCD) device using the TFT array of the present invention.

FIG. 1 is a plan view showing schematically the structure of a TFT array according to a first embodiment of the present invention, and FIG. 2 is a cross-sectional view of an active matrix type liquid crystal display device (TFT-LCD) using the TFT array of the present invention.

As is shown in FIG. 2, a liquid crystal display (LCD) device using a TFT array according to the present invention comprises a TFT array 110 having an orientation film 20 formed to cover pixel electrodes 15 and TFTs 14, an opposed substrate 24 having an opposed electrode 22 facing the pixel electrodes 15 and an orientation film 23 covering the opposed electrode 22, a liquid crystal (LC) layer 21 with a predetermined thickness interposed between the opposed substrate 24 and TFT array 110, and a seal member for connecting the opposed substrate 24 and TFT array 110 with a predetermined gap therebetween.

The TFT array 110 has the following structure. Address lines 12 extending in rows and data lines 13 extending in columns are arranged on a transparent insulative substrate 11 such that the address lines 12 intersect the data lines 13 at right angles in a mutually insulated manner. TFTs 14 and pixel electrodes 15 are provided at intersections of the address lines 12 and data lines 13. The TFTs 14 are electrically connected to the lines 12 and 13, and the pixel electrodes 15 are electrically connected to the TFTs 14. The pixel electrodes 15 are arranged in rows and columns to form a display region.

A short-wiring or short-ring 16 made of an electrically conductive film is formed at an outer peripheral portion of the substrate 11. The address lines 12 and data lines 13 extend from the display region and electrically are connected to the short-wiring 16. The short-wiring 16 is cut out along broken lines 17 in FIG. 1, after the manufacturing process of the TFT array 110 has been completed or after the opposed substrate 24 facing the TFT array 110 has been bonded in the process of forming LC cells.

A short-wiring 18 surrounding the display region is formed in the vicinity of the outer edge of the display region and within the cut-out lines 17, such that the short-wiring 18 intersects the address lines 12 and data lines 13 in an insulated manner. A data-line connection portion 18a of the short-wiring 18, which is substantially parallel to the address lines 12, is formed on the substrate 11. An address-line connection portion 18b of the short-wiring 18, which is substantially parallel to the data lines 13, is formed on a gate insulating film 42 (described later). The short-wiring 18 is connected to the address lines 12 and data lines 13 by two-terminal elements (SCLC elements) 19 having non-linear voltage/current characteristics determined by a space charge limited current.

Figure 3:
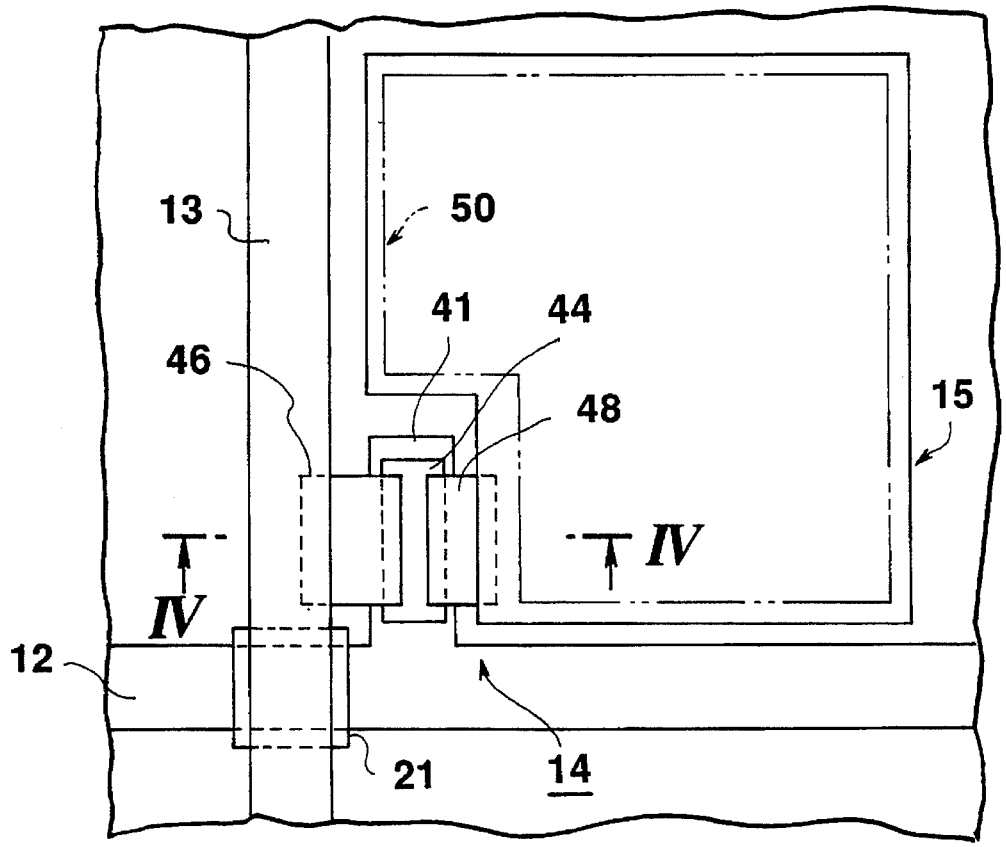
FIG. 3 is a partially enlarged view showing a part of the TFT array shown in FIG. 1.
Figure 4:
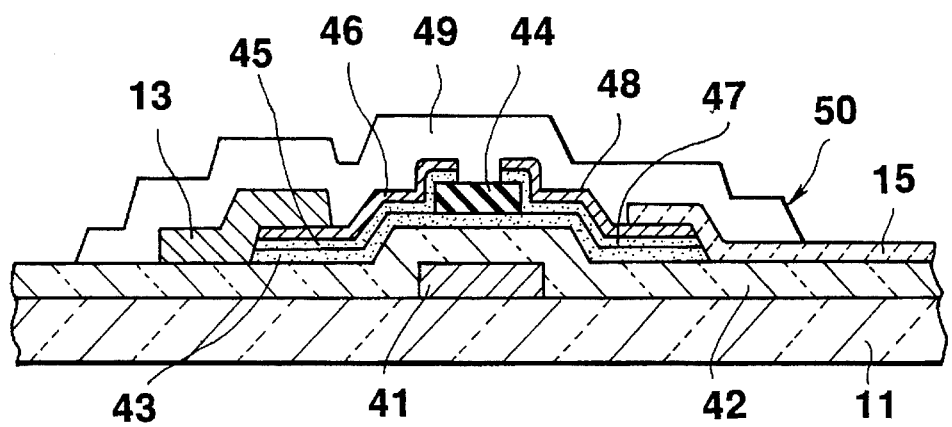
FIG. 4 is a cross-sectional view of the TFT section taken along line IV—IV in FIG. 3.

FIGS. 3 and 4 show the structures of the TFT 14 and pixel electrode 15 arranged at an intersection between the address lines 12 and data lines 13 of the TFT array 110. As shown in these figures, the address lines 12 intersect the data lines 13 via gate insulating films 42 and intersection insulating films 21 (described later). In the vicinity of the intersection, there is provided TFT 14 having a gate electrode 41 connected to the address line 12 and a drain electrode 46 connected to the data line 13. The source electrode of the TFT 14 is connected to the pixel electrode 15.

The TFT 14 has the following structure. The gate electrode 41 projecting from the address line 12 and the gate insulating film 42 covering the gate electrode 41 are formed on the substrate 11. A semiconductor film 43 of amorphous silicon is formed on the gate insulating film 42 at a location above the gate electrode 41, and thus a device region is formed. A blocking layer 44 of silicon nitride is formed on a channel portion of the semiconductor film 43. On one side of the semiconductor film 43, the drain electrode 46 is formed via an ohmic contact layer 45 made of an impurity-doped semiconductor. The drain electrode 46 is connected to the data line 13. On the other side of the semiconductor film 43, the source electrode 48 is formed via an ohmic contact layer 47 made of an impurity-doped semiconductor. The source electrode 48 is connected to the display electrode 15 made of a transparent electrically conductive film. In addition, a protection film 49 is formed on the TFT 14.

Figure 5:
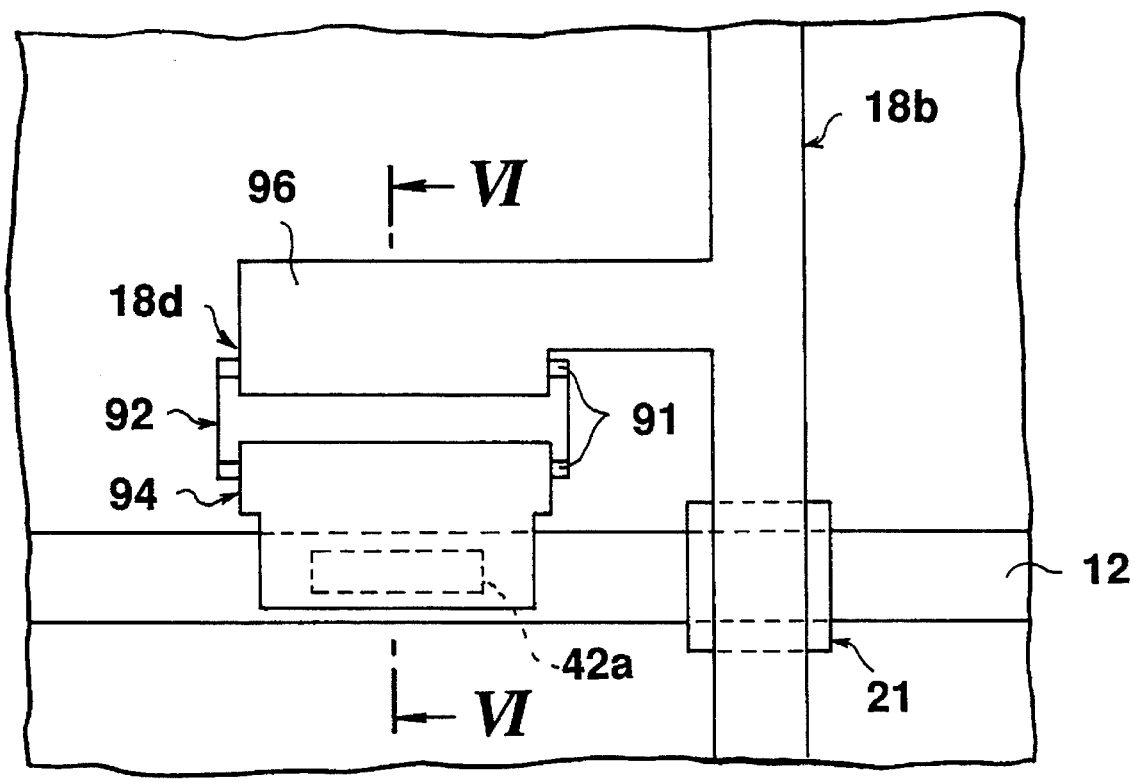
FIG. 5 is a partially enlarged view showing a two-terminal element portion of the TFT array shown in FIG. 1.
Figure 6:
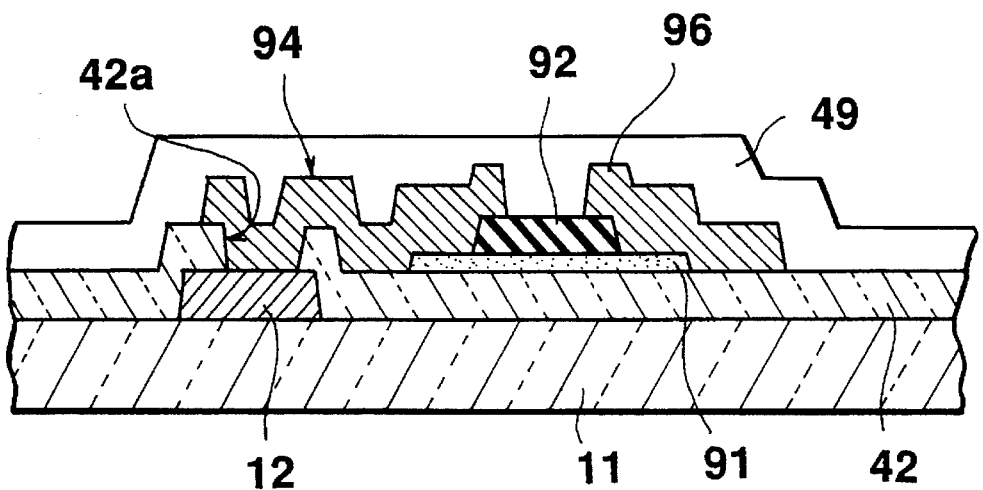
FIG. 6 is a cross-sectional view of the two-terminal element portion taken along line VI—VI in FIG. 5.

FIGS. 5 and 6 show the structure of the short-wiring 18 arranged to intersect the address lines 12 and data lines 13 and the structure of the SCLC element 19 connected between the short-wiring 18 and the address and data lines 12 and 13. Specifically, the SCLC element 19 formed at a connection portion between the address line 12 and short-wiring 18 is constructed such that an island-shaped semiconductor film 91 is formed on the gate insulating film 42 covering the address line 12 formed on the substrate 11. Furthermore, a semiconductor protection layer 92 for separating two electrodes and protecting the semiconductor film 91 is formed on the semiconductor layer 92, and electrodes 94 and 96 are formed on both side portions of the semiconductor film 91 between which the protection layer 92 is formed. One of the electrodes, 94, is connected to the address line 12 via a hole 42a formed in the gate insulating film 42. The other electrode 96 is connected directly to the upper short-wiring section 18b of the short-wiring 18. These two-terminal device regions are covered by the protection film 49. The SCLC element 19 formed at a connection portion between the data line 13 and short-wiring 18 is constructed similarly. Although not shown, one of the electrodes, 94, is connected directly to the data line 13 and the other electrode 96 is connected to the lower short-wiring section 18b of the short-wiring 18 via a hole formed in the gate insulating film 42.

Figure 7:
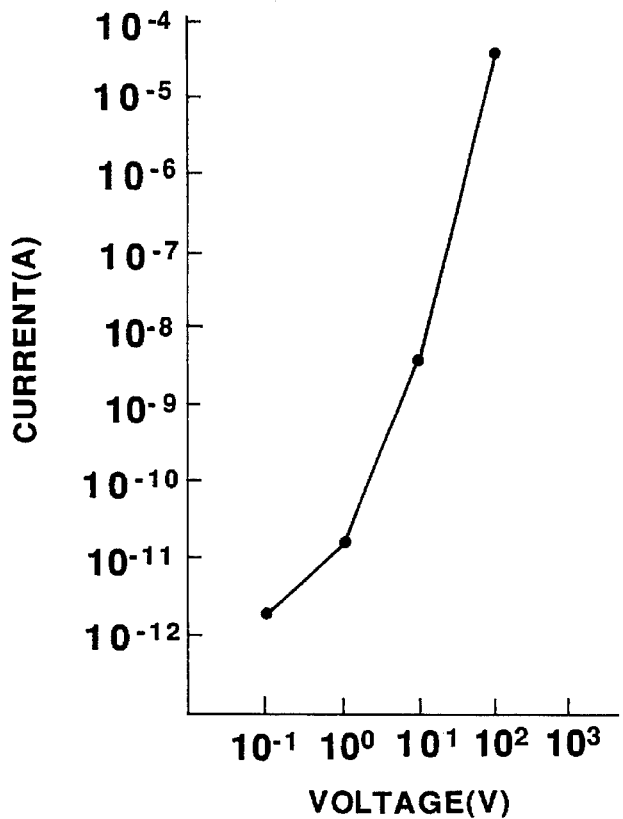
FIG. 7 is a graph showing voltage/current characteristics of the two-terminal element shown in FIG. 6.

As regards the structure of the SCLC element 19 shown in FIGS. 5 and 6, an ohmic contact layer is not provided between both electrodes 94 and 96, on the one hand, and the semiconductor film 91, on the other hand. Thus, a double-injection type thin-film non-linear resistor element, in which both electrons and holes are injected as carriers, is formed. Specifically, as shown in FIG. 7, the electrons and holes in the SCLC element are trapped at a local level in a band gap of amorphous silicon in accordance with an increase in applied electric field voltage, and a space charge is produced. As a result, a Fermi level shifts to the conduction band, the conduction electron density increases, and the current increases rapidly irrespective of voltage. If the applied electric field further increases, the holes begin to pass through the element and the injection amount of carriers increases. Injection becomes predominant over recombination. Flow of current is facilitated by double injection of holes and electrons. Accordingly, when a high-voltage is applied to the address lines 12 and/or data lines 13 due to static electricity, a large current flows and a substantial short-circuit state is created.

According to this embodiment, the short-wiring 18 surrounding the display region is formed in the vicinity of the outer edge of the display region and within the cut-out lines, such that the short-wiring 18 intersects the address lines 12 and data lines 13 in an insulated manner. The short-wiring 18 is electrically connected to the address lines 12 and data lines 13 by the SCLC elements 19 having the above-mentioned high non-linear voltage/current characteristics. Thus, in the case where a high voltage due to static electricity is applied to at least one of the address line 12 or data line 13 after the short-wiring 16 is cut out along broken lines 17, following the completion of the manufacturing process of the TFT array or the bonding of the opposed substrate facing the TFT array in the process of forming LC cells, a large current flows through the SCLC element 19 to equalize the potentials of the address line 12 and data line 13. Therefore, even if a high voltage due to static electricity is applied to the address line 12 or data line 13 after cutting out the short-wiring, insulation between the lines 12 and 13 or between the gate electrode 41 and drain electrode 46 of the TFT 14 is neither deteriorated nor lost.

The LC display using the TFT array is normally driven by a voltage of about 25 V. Thus, as shown in FIG. 7, the resistance of the SCLC element 19 in this voltage region is sufficiently high, and a leak current flowing between the address lines 12, between the data lines 13 and between the address lines 12 and data lines 13 is very low in the order of $10^{-9}$ to $10^{-7}$ A. Thus, the influence on data signals applied to the pixel electrodes 15 is low and clear images can be displayed. Furthermore, after the short-wiring is cut, electrical inspections regarding line breakage or short-circuit can be performed and the characteristics of the TFTs can be electrically measured.

A process for manufacturing the above-mentioned TFT array will now be described with reference to FIGS. 8A to 10E. FIGS. 8A to 8E show the sequential steps for manufacturing the TFT portion, FIGS. 9A to 9E show the sequential steps for manufacturing the SCLC element, and FIGS. 10A to 10E show the sequential steps for manufacturing the intersection portions between the address lines 12 and the data-line connecting portion 18b formed on the address lines 12, and the contact portions 18c between the data-line connecting portion 18a and address-line connecting portion 18b formed over and under the short-wiring 18.

A metal or alloy thin film of Cr, Al, Ta, Ti, etc. is deposited on a transparent insulative substrate 11 of glass, etc. by means of sputtering. Selective etching is performed to form a gate electrode 41 shown in FIG. 8A and an address line 12 and a lower data-line connecting portion 18a (hereinafter referred to as "lower short-wiring section") shown in FIGS. 9A and 10A. In these steps, a short-wiring 16 is simultaneously formed at an outer peripheral portion of the substrate 11 shown in FIG. 1.

Figure 8A:
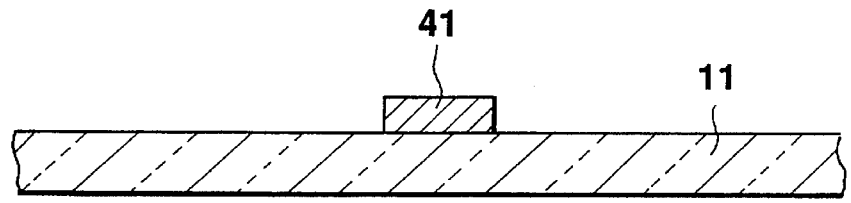
FIGS. 8A to 8E are views for illustrating sequential steps for manufacturing the TFT portion of the TFT array.
Figure 8B:
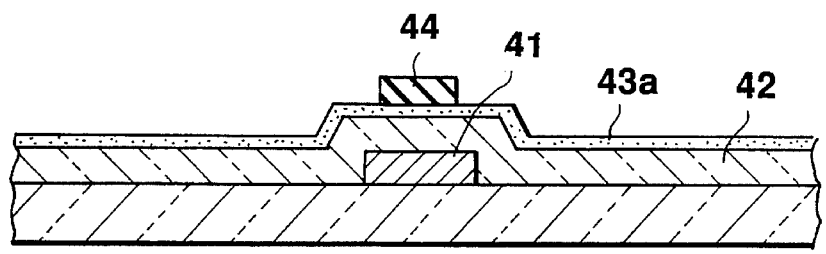
Figure 9A:
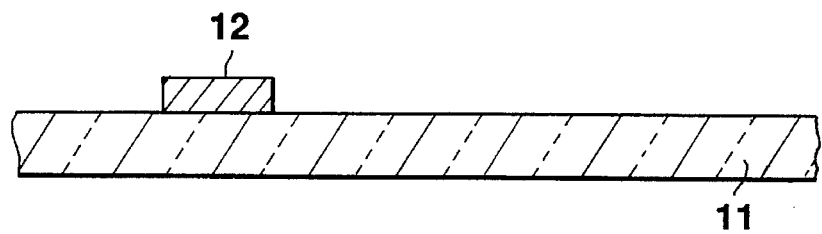
FIGS. 9A to 9E are views for illustrating sequential steps for manufacturing the two-terminal device portion of the TFT array.
Figure 9B:
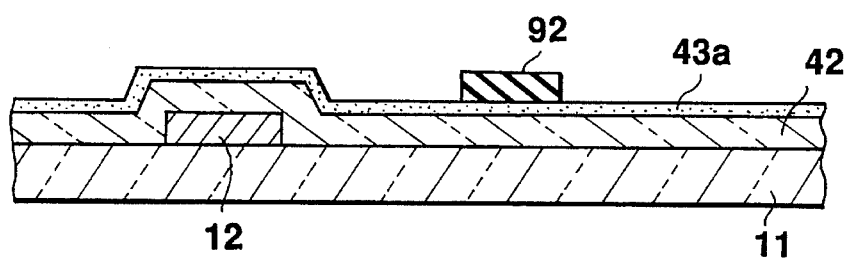
Figure 10A:
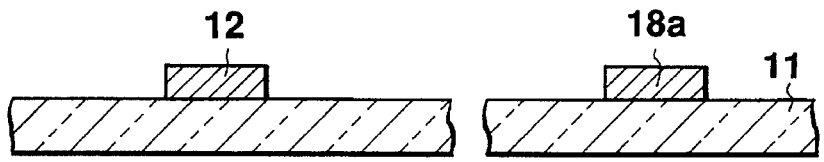
FIGS. 10A to 10E are views for illustrating sequential steps for manufacturing the intersection portions of the short-wiring and address lines of the TFT array, and the connecting portions of the short-wiring.
Figure 10B:
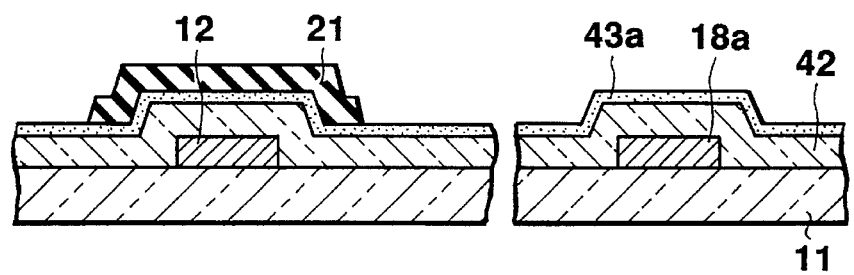

Three thin films, i.e. a silicon nitride film serving as gate insulating film 42, an amorphous silicon film 43a serving as semiconductor layer 43 and a silicon nitride film serving as blocking layer 44, are successively formed by plasma CVD processes on the substrate 11 on which the gate electrode 41, etc. have been formed. Unnecessary portions are removed to leave only the portions of the uppermost silicon nitride film which correspond to the channel portion of the TFT 14, as shown in FIG. 8B, the semiconductor protection layer 92 of the SCLC element 19, as shown in FIG. 9B, and the intersection portion between the address line 12 and the upper short-wiring section 18b (described later), as shown in FIG. 10B. Thus, the blocking layer 44, semiconductor protection layer 92 and inter-line insulating film 21 are formed.

Figure 8C:
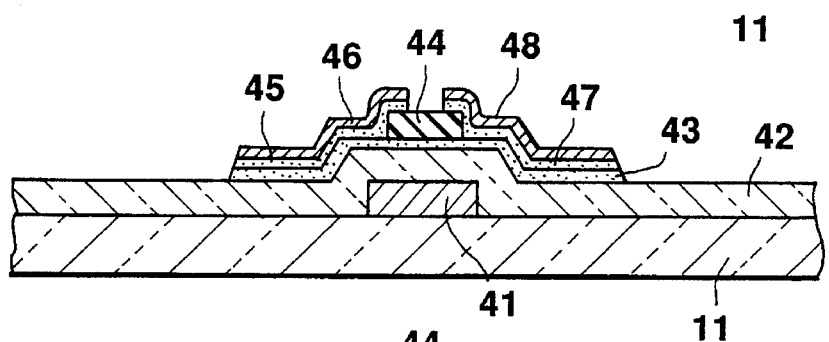
Figure 9C:
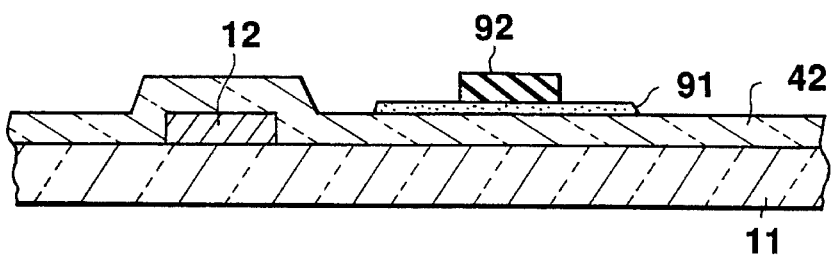
Figure 9D:
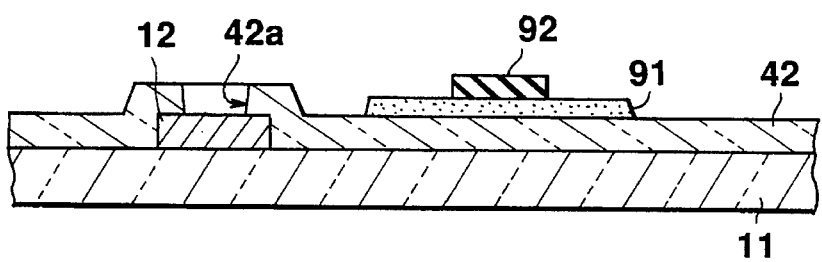
Figure 10C:
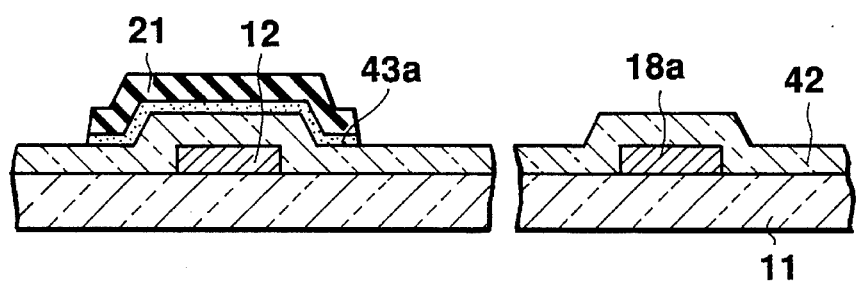

Amorphous silicon layers doped with impurities, which will serve as ohmic contact layers 45 and 47, are formed by a plasma CVD process on the entire upper surface of thee amorphous silicon film on the substrate 11, on which the blocking layer 44, etc. are formed. Subsequently, metal thin films of Cr, etc. are successively deposited by a sputtering process. Thereafter, the metal thin films on areas other than the device region of TFT 14, the impurity-doped amorphous silicon layers, and the amorphous silicon film are successively etched away. In addition, the metal thin films on the blocking layer 44 of the TFT and on the semiconductor protection layer 92, and the impurity-doped amorphous silicon layers are etched away. Thus, as shown in FIG. 8C, the source electrode 48 and drain electrode 46 of the TFT 14 and the device region are formed, and, as shown in FIG. 9C, the device region of the SCLC element 19 is formed. Furthermore, as shown in FIG. 10C, the amorphous silicon film 43a is removed, except the intersection portion between the address line 12 and the upper short-wiring section 18b.

Figure 8D:
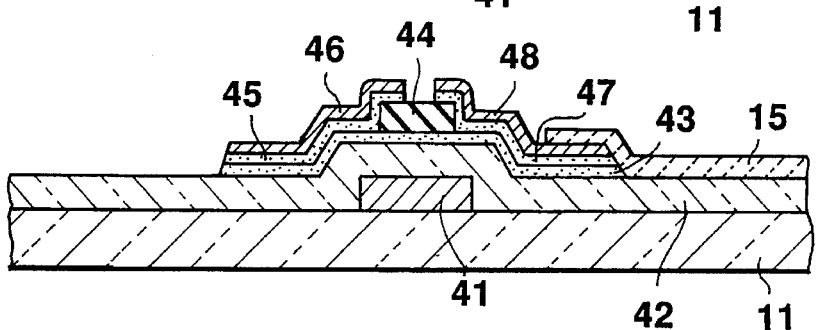
Figure 10D:
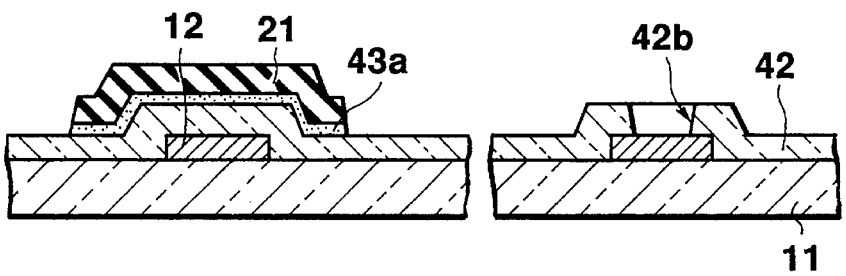

Then, a transparent electrically conductive film made of ITO, etc. is deposited on the TFT 14, SCLC element 19 and gate insulating film 42 on the substrate 11. The transparent electrically conductive film is etched and a pixel electrode 15 connected to the source electrode 48 of TFT 14 is formed, as shown in FIG. 8D. Subsequently, a silicon nitride film on the terminal (not shown) of the address line for connecting the address line 12 to the driving circuit is removed. Simultaneously, a contact hole 42a is formed in the silicon nitride film on the address line 12, shown in FIG. 9D, and a contact hole 42b is formed on the lower short-wiring section 18a, as shown in FIG. 10D.

Figure 8E:
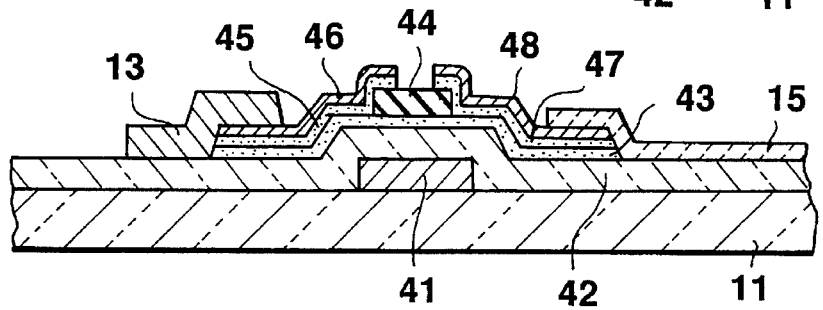
Figure 9E:
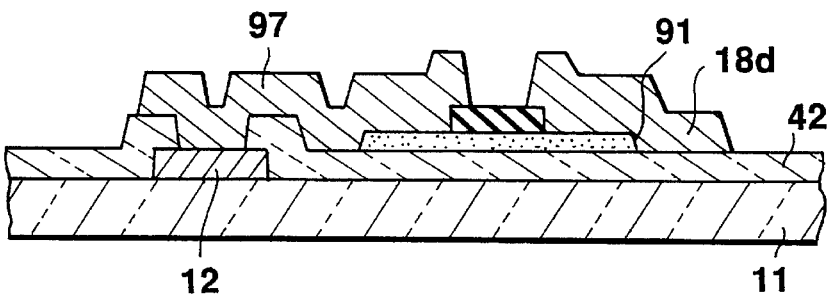
Figure 10E:
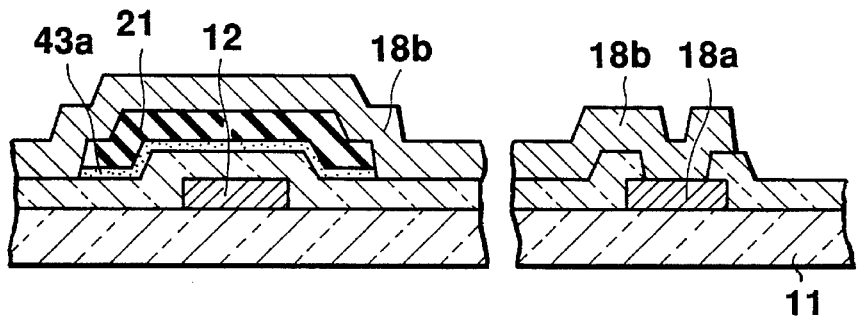

Thereafter, a metal film or alloy film of Al, Ti, Mo, etc. or a lamination film of such metal films is deposited on the TFT by means of sputtering. The deposited film is then etched to form a data line 13 as shown in FIG. 8E, one electrode 94 and the other electrode 96 connecting the address line 12 and SCLC element 19 as shown in FIG. 9E, and an upper short-wiring section portion 18b (hereinafter referred to as "upper short-wiring section") of the short-wiring 18, which is parallel to the data wiring 13, as shown in FIG. 10E.

Through the above steps, the drain electrode 46 of the TFT 14 is connected to the data line 13, the data line 13 is connected to one electrode of the SCLC element 19 at a portion intersecting the lower short wiring 18a, and the other electrode of the SCLC element 19 is connected to the lower short-wiring section 18a. One of the electrodes of the SCLC element 19 arranged at the intersection between the address line 12 and upper short-wiring section 18b is connected to the upper short-wiring section 18b. The upper short-wiring section 18b is connected to the lower short-wiring section 18a via the contact hole 42b formed in the silicon nitride film on the lower short-wiring section 18a and is insulated from the address line 12 by the silicon nitride film for forming the gate insulating film 42, the amorphous silicon film 43a, and the silicon nitride film for forming the blocking layer 44 of TFT 14.

Finally, a silicon nitride film which will become a protection layer 49 is formed by a plasma CVD process over the entire surface of the substrate, and then the silicon nitride film is etched, thus forming terminal portions at ends of the address line 12 and data line 13 for connection with the driving circuit, as shown in FIGS. 4 and 6. In addition, that portion of the silicon nitride film, which corresponds to the pixel region 50 on the display electrode 15, is removed to form the protection film 49.

As has been described above, according to the TFT array of the present embodiment, the TFTs 14 on the substrate, the address wiring 12 and data wiring 13, and SCLC elements 19 connecting these wirings are successively formed by the steps for forming and etching the thin films of the TFTs 14, without providing special films in the steps for forming the TFTs 14. Thus, the number of steps for forming the SCLC elements 19 does not increase, and the TFT array having the SCLC elements 19 can easily be manufactured.

In the above embodiment, the gate electrode 41 and address line 12 are formed of a metal or alloy layer of Cr, Al, Ta, Ti, etc. However, the method for producing the gate electrode 41 and address line 12 is not limited to this. A lamination film of such films of metal, etc. may be used. In order to enhance insulation of the gate electrode 41 and address line 12, the surface thereof may be oxidized partly or entirely by means of anode oxidation, thermal oxidation, etc.

The first embodiment is also applicable to a TFT having a structure wherein the blocking layer 44 and semiconductor protection film 92 are not formed, or to a TFT array in which SCLC elements are arranged.

Figure 11:
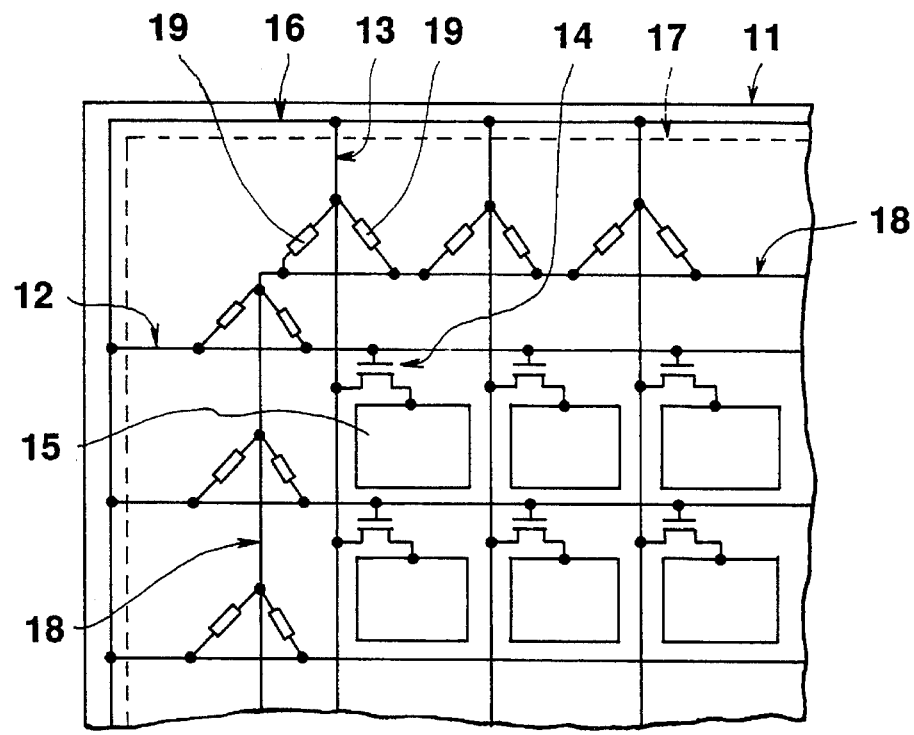
FIG. 11 is a plan view showing a modification of the TFT array according to the first embodiment.

Moreover, in the first embodiment, as shown in FIG. 11, two or more SCLC elements 19 may be connected between the address lines 12, data lines 13, and short-wiring 18 in a parallel fashion. According to this structure, when the SCLC element 119 is turned on, the power conduction performance of the parallel circuit of the SCLC element 19 increases double or more, and the protection effect against static electricity can be enhanced.

Although not shown, according to the first embodiment, two or more SCLC elements 19 may be connected in series between the address lines 12, and similarly two or more SCLC elements 19 may be connected in series between the data lines 13. In this case, the turn-off resistance of the series circuit of the SCLC elements 19 increases, thereby decreasing a leak current flowing between the address lines 12, between the data lines 13, and between the address lines 12 and data lines 13.

[Second Embodiment]

In the present invention, the double-injection type SCLC elements which are used in the first embodiment of the present invention as thin-film non-resistance elements for connecting the short wiring with the address and data lines, may be replaced by other two-terminal elements having similar non-linear characteristics. A second embodiment of the invention in which electron injection type SCLC elements are used as two-terminal elements will now be described in detail with reference to FIGS. 12 to 17. The structural elements already mentioned in the first embodiment will be denoted by like reference numerals, a description thereof will be omitted.

FIGS. 12 to 15 show the structures of short-wiring 18 arranged so as to intersect address lines 12 and data lines 13, and SCLC elements 29 connected between the short-wiring 18 and the address and data lines 12 and 13. Specifically, an island-shaped semiconductor film 91 is formed on a gate insulating film 42 covering the address line 12 formed on the substrate 11. A semiconductor protection layer 92 for separating two electrodes and protecting the semiconductor film 91 is formed on the semiconductor film 91. Electrodes 94 and 96 are formed on both side portions of the semiconductor film 91, between which the semiconductor protection layer 92 is interposed, via impurity-doped semiconductor ohmic contact layers 93 and 95. One of the electrodes, 94, is connected to the address line 12 via a connection conductor 97 through a hole 42a formed in the gate insulating layer 42. The other electrode 96 is connected directly to the upper connection wiring 18b of the short-wiring 18. These two-terminal device regions are covered by the protection film 49. SCLC elements 29 formed at connection portions between the data lines 13 and short-wiring 18 are similarly formed. Although not shown, the electrode 94 is connected directly to the data line 13, and the other electrode 96 is connected to the upper short-wiring section 18b of short-wiring 18 through a hole formed in the gate insulating layer 42.

Figure 12:
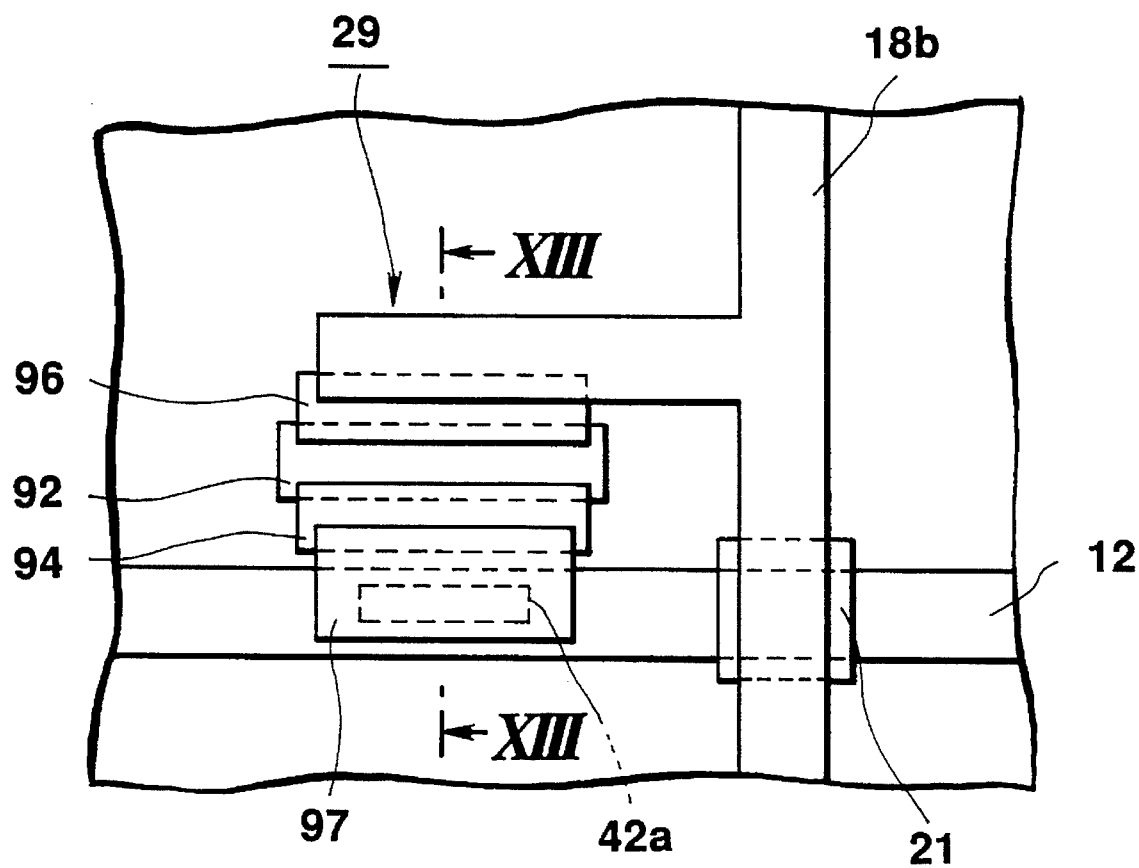
FIG. 12 is a partially enlarged view showing a two-terminal device portion of a TFT array according to a second embodiment of the invention.
Figure 13:
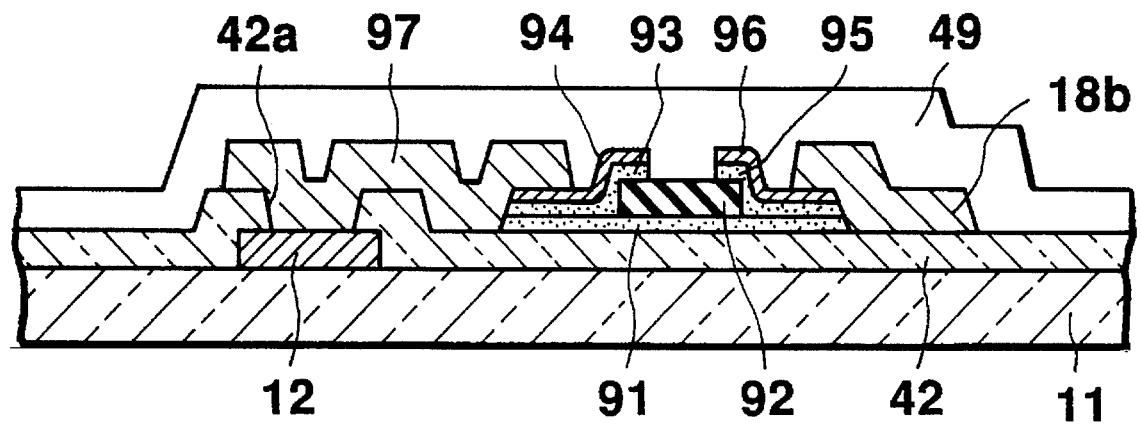
FIG. 13 is a cross-sectional view of the two-terminal device portion taken along line XIII—XIII in FIG. 12.
Figure 14:
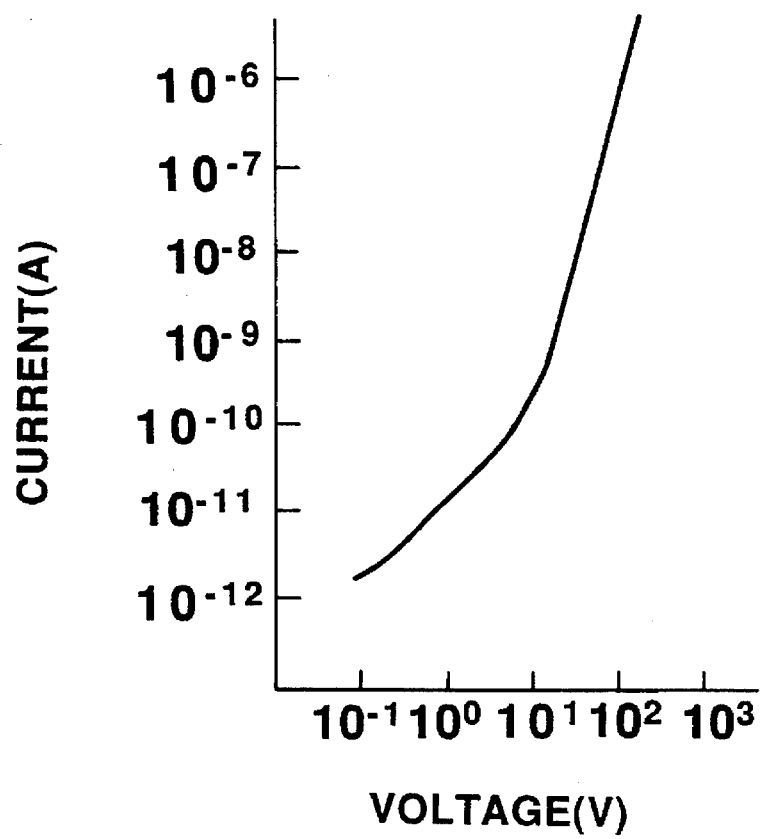
FIG. 14 is a graph showing voltage/current characteristics of the two-terminal element shown in FIG. 13.

In the SCLC element 29 shown in FIGS. 12 and 13, as the voltage applied across both electrodes 94 and 96 increases, excess electrons injected in the amorphous silicon are trapped at a local level in the band gap of the amorphous silicon, and a space charge is created. As a result, the Fermi level shifts to the conduction side and therefore the conduction electron density increases. The current is not proportional to the voltage and increases rapidly. Such a current is called a space charge limited current, and a semiconductor having a local level such as amorphous silicon exhibits high non-linear current/voltage characteristics, as shown in FIG. 14.

By using this SCLC element as non-linear two-terminal element, the same advantage as in the first embodiment can be obtained: even if a high voltage is applied to one of address lines 12 and data lines 13 owing to static electricity, after the short-wiring formed at an outer peripheral portion of the substrate is cut out in the step of cutting the substrate, a large current flows through the SCLC element and the potentials of the address lines 12 and data lines 13 are immediately equalized and no insulation breakage occurs between the address lines 12 and data lines 13.

The LC display using this TFT array is normally driven by a voltage of about 25 V. Thus, as shown in FIG. 14, the resistance of the SCLC element 29 in this voltage region is sufficiently high, and a leak current flowing between the address lines 12, between the data lines 13 and between the address lines 12 and data lines 13 is very low in the order of $10^{-10}$ A. Thus, the influence on data signals applied to the display electrodes 15 is low.

The manufacturing steps of the TFT 14 and SCLC element 29 of the above-described TFT array will now be described with reference to FIGS. 8A to 8E and FIGS. 15A to 15E.

A metal or alloy thin film of Cr, Al, Ta, Ti, etc. is deposited on a transparent insulative substrate 11 of glass, etc. by means of sputtering. Selective etching is performed to form a gate electrode 41 shown in FIG. 8A and an address line 12 shown in FIG. 15A.

Figure 15A:
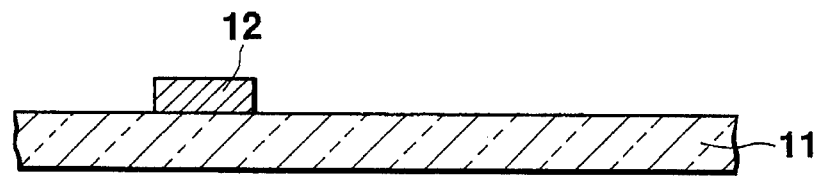
FIGS. 15A to 15E are views for illustrating sequential steps for manufacturing the two-terminal device portion of the TFT array.
Figure 15B:
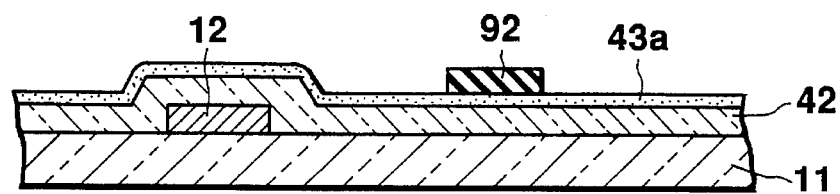

Three thin films, i.e. a silicon nitride film serving as gate insulating film 42, an amorphous silicon film 43a serving as semiconductor layer 43 and a silicon nitride film serving as blocking layer 44, are successively formed by a plasma CVD process on the substrate 11 on which the gate electrode 41, etc. have been formed. Unnecessary portions are removed to leave only the portions of the uppermost silicon nitride film which correspond to the channel portion of the TFT 14, as shown in FIG. 8B, and the semiconductor protection layer 92 of the SCLC element 29, as shown in FIG. 15B. Thus, the blocking layer 44 and semiconductor protection layer 92 are formed.

Figure 15C:
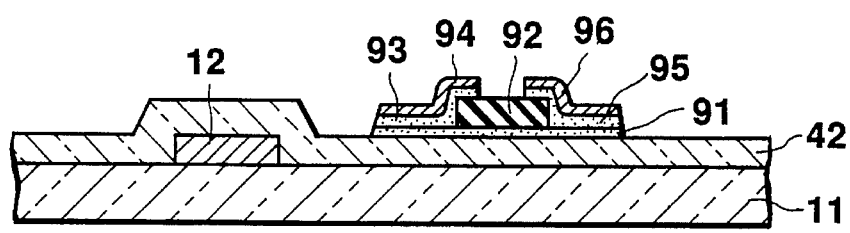
Figure 15D:
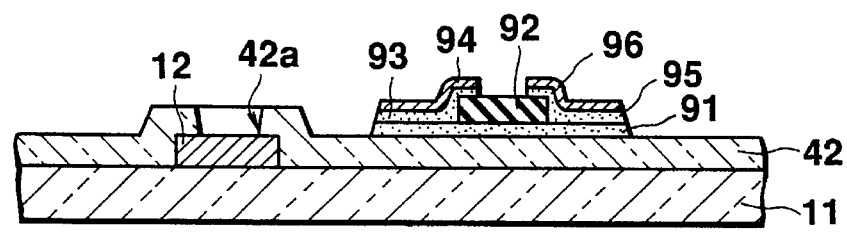

Impurity-doped amorphous silicon layers which will become ohmic contact layers 45, 47, 93 and 95 are formed by a plasma CVD process on the entire upper surface of the amorphous silicon film on the substrate 11, on which the blocking layer 44, etc. are formed. Subsequently, metal thin films of Cr, etc. are successively deposited by a sputtering process. Thereafter, the metal thin films on areas other than the device region of TFT 14 and the device region of the SCLC element 29, the impurity-doped amorphous silicon layers, and the amorphous silicon film are successively etched away. In addition, the metal thin films on the blocking layer 44 of the TFT and on the semiconductor protection layer 92, and the impurity-doped amorphous silicon layers are etched away. Thus, as shown in FIG. 8C and FIG. 15C, the source electrode 48 and drain electrode 46 of the TFT 14 and the two electrodes 94 and 96 of the SCLC element 29 are formed.

Then, a transparent electrically conductive film made of ITO, etc. is deposited on the TFT 14, SCLC element 29 and gate insulating film 42 on the substrate 11. The transparent electrically conductive film is etched and a display electrode 15 connected to the source electrode 48 of TFT 14 is formed, as shown in FIG. 8D. Subsequently, a silicon nitride film on the terminal (not shown) of the address line for connecting the address line 12 to the driving circuit is removed. Simultaneously, a contact hole 42a is formed in the silicon nitride film on the address line 12, shown in FIG. 15D.

Figure 15E:
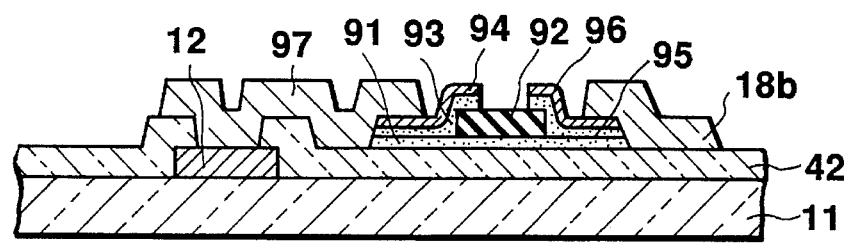

Thereafter, a metal film or alloy film of Al, Ti, Mo, etc. or a lamination film of such metal films is deposited on the TFT by means of sputtering. The deposited film is then etched to form a data line 13 as shown in FIG. 8E, a connection conductor 97 connecting the address line 12 and SCLC element 29 as shown in FIG. 15E, and an upper short-wiring section 18b which is parallel to the data line 13 of the short-wiring 18.

Through the above steps, the drain electrode 46 of the TFT 14 is connected to the data line 13, the data line 13 is connected to the electrode 94 of the SCLC element 29 at a portion intersecting the lower short wiring 18a, and the other electrode 96 of the SCLC element 29 is connected to the lower short-wiring section 18a. One of the electrodes of the SCLC element 29 arranged at the intersection between the address line 12 and upper short-wiring section 18b is connected to the upper short-wiring section 18b. The upper short-wiring section 18b is connected to the lower short-wiring section 18a via the contact hole formed in the silicon nitride film on the lower short-wiring section 18a and is insulated from the address line 12 by the silicon nitride film for forming the gate insulating film 42, the amorphous silicon film 43a, and the silicon nitride film for forming the blocking layer 44 of TFT 14.

Finally, a silicon nitride film which will become a protection layer 49 is formed by a plasma CVD process over the entire surface of the substrate, and then the silicon nitride film is etched, thus forming terminal portions at ends of the address line 12 and data line 13 for connection with the driving circuit, as shown in FIGS. 12 and 13. In addition, that portion of the silicon nitride film, which corresponds to the pixel region 50 on the pixel electrode 15, is removed to form the protection film 49.

According to the TFT array of the second embodiment, too, the TFTs 14 on the substrate, the address wiring 12 and data wiring 13, and SCLC elements 29 connecting these wirings are successively formed by the steps for forming and etching the thin films of the TFTs 14, without providing special films in the steps for forming the TFTs 14. Thus, the number of steps for forming the SCLC elements 29 does not increase, and the TFT array having the SCLC elements 29 can easily be manufactured.

Figure 16:
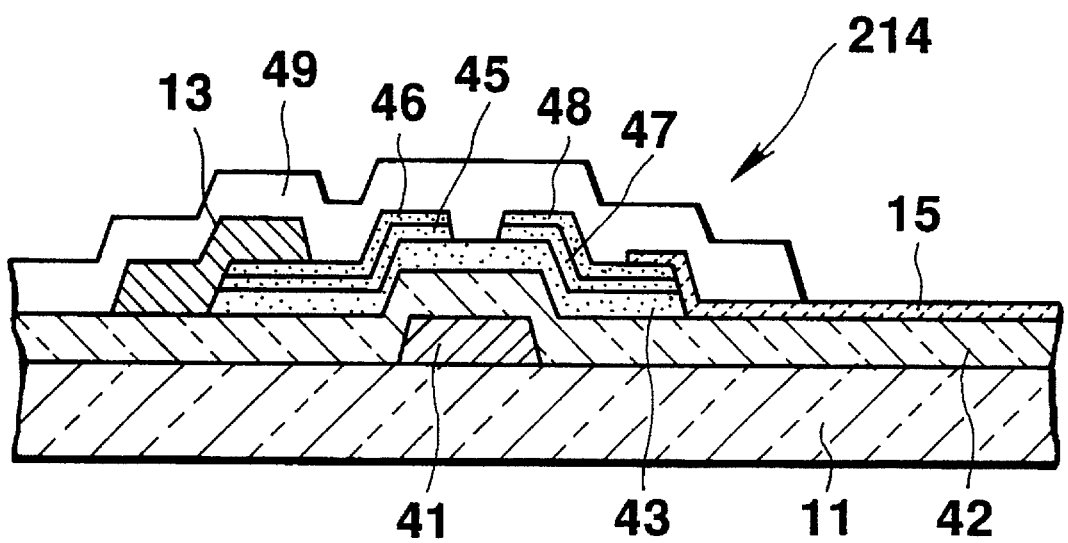
FIG. 16 is a cross-sectional view showing a modification of the TFT portion according to the second embodiment of the invention.
Figure 17:
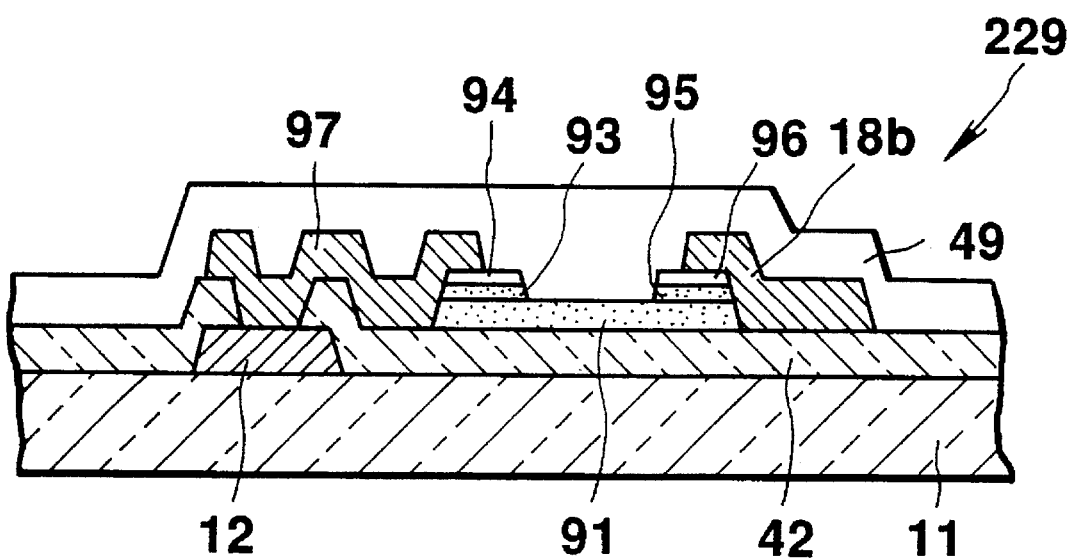
FIG. 17 is a cross-sectional view showing a modification of the two-terminal device portion according to the second embodiment of the invention.

As is shown in FIGS. 16 and 17, the present invention is applicable to a TFT array having TFTs and SCLC elements which are not provided with the blocking layer 44 or semiconductor protection film 92 of the second embodiment. The structures shown in FIGS. 16 and 17 will now be described. The structural elements already mentioned in the second embodiment will be denoted by like reference numerals, and a description thereof will be omitted.

FIG. 16 shows a cross-sectional structure of the TFT according to this example, and FIG. 17 shows a cross-sectional structure of the SCLC element. In the TFT 214 shown in FIG. 16, metal films are formed on a semiconductor film 43 via ohmic contact layers 45 and 47. The semiconductor film 43 covers a gate electrode 41 via a gate insulating film 42. A drain electrode 46 and a source electrode 48 are constituted by the ohmic contact layers 45 and 47 and the metal films. A channel portion is formed in the semiconductor film 43 between the source electrode 48 and drain electrode 46. The pixel electrode 15 made of the transparent electrically conductive film is connected to the source electrode 48, and the drain electrode 46 is connected to the data line 13.

In the SCLC element 229 shown in FIG. 17, a semiconductor film 91 is formed on a silicon nitride film which will become a gate insulating film 42 of the TFT 214. At both ends of the semiconductor film 91, metal films are formed via ohmic contact layers 93 and 95, thus forming two electrodes 94 and 96. One of the electrodes, 96, of the SCLC element 229 is connected to the upper short-wiring section 18b, and the other electrode 94 is connected to the address line 12.

In this example, the arrangement and connection of the TFT 214, SCLC element 229, address lines 12, data lines 13, and short-wiring 18 are the same as in the second embodiment.

The SCLC element 229 is formed in the process of forming the TFT 214, in the same manner as in the second embodiment. Specifically, the TFT 214 and SCLC element 229 are formed in the following manner. The gate electrode 41, address wiring 12 and lower short-wiring section 18a are formed on the substrate. Then, the silicon nitride film which will become the gate insulating film 42, amorphous silicon film which will become the semiconductor film 43 and impurity-doped amorphous silicon layers which will become the ohmic contact layers 45, 47, 93 and 95, and metal films are successively formed on the substrate. These laminated films are successively etched, and thereby the TFT and SCLC device regions are formed. Further, those portions of the metal films and impurity-doped amorphous silicon layers, which correspond to the channel portion of the TFT 114 and to the portion between the electrodes of the SCLC element 229, are etched away, and the elements 214 and 229 are formed.

In this example, too, the same advantages as in the second embodiment are obtained.

[Third Embodiment]

According to the first and second embodiments, dielectric breakdown due to DC static electricity, which occurs, e.g. when the TFT substrate is rubbed, can surely be prevented. However, in the process of manufacturing the TFT panel and LC device, impulse-like static electricity is applied in many cases, and the manufacturing yield is decreased owing to application of impulse-like static electricity.

More specifically, a short-line for connecting address lines and data lines at an outer peripheral portion of the substrate has, in itself, resistance and floating capacitance, and therefore the short-line has a time constant. Because of the time constant of the short-line, a time corresponding to the time constant is needed for propagation of impulses if impulse-like static electricity is applied to the address line or data line. Thus, a large potential distribution occurs in the short-wiring instantaneously, and the potentials of the gate and drain of the TFT cannot be kept at equal values. As a result, dielectric breakdown occurs.

Third and fourth embodiments relate to structures of the TFT array capable of preventing dielectric breakdown due to application of impulse-like static electricity.

Figure 18:
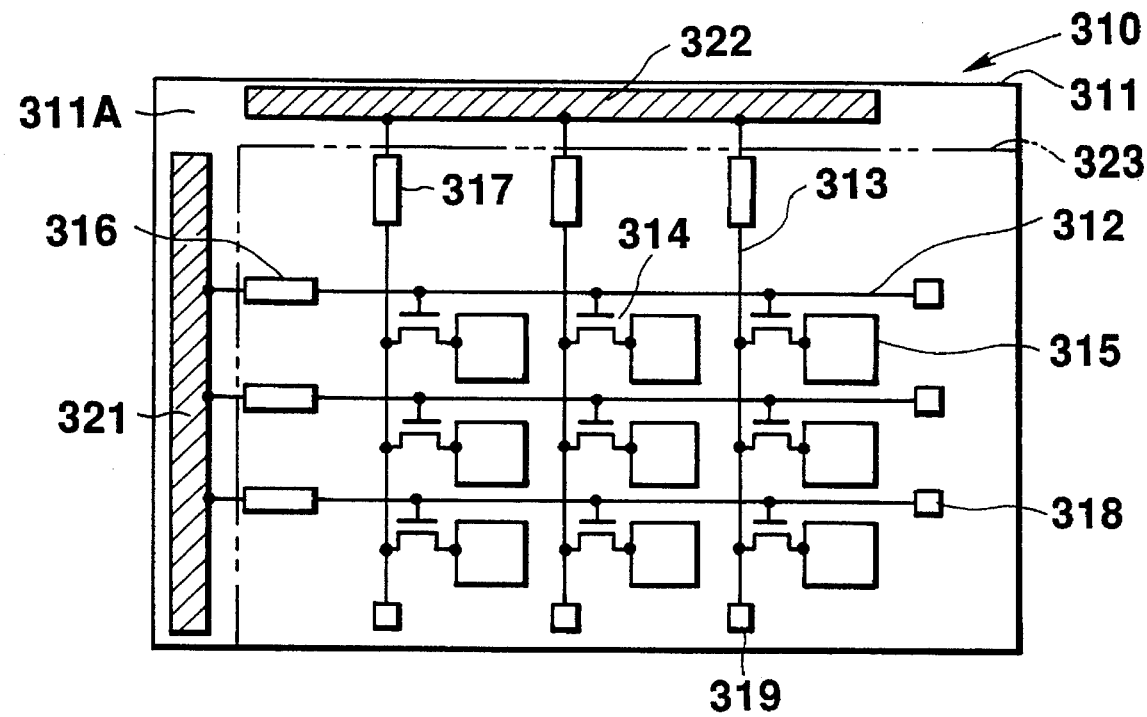
FIG. 18 is a plan view showing a TFT array according to a third embodiment of the invention.

The third embodiment of the invention will now be described with reference to FIGS. 18 to 20. FIG. 18 shows a TFT array 310. Address lines 312 extending in rows and data lines 313 extending in columns are arranged on an insulative transparent substrate 311 such that the address lines 312 intersect the data lines 313 in an insulated manner. TFTs 314 connected to the address and data lines 312 and 313 are arranged at intersections of these lines 312 and 313, and also pixel electrodes 315 connected to the TFTs 314 are arranged at intersections of the address and data lines 312 and 313. These pixel electrodes 315 are arranged in a matrix to form a display region. An address line terminal 316 and an address line sub-terminal 318 are provided at one and the other end of each address line 312. A data line terminal 317 and a data line sub-terminal 319 are provided at one and the other end of each data line 313.

An address line short-conductor 321 for shorting only the group of address lines 312 and a data line short-conductor 322 for shorting only the group of data lines 313 are formed along an edge portion of the substrate 311, such that the short-conductor 321 is electrically separated from the short-conductor 322. The address lines 312 and data lines 313 are connected respectively to the address line short-conductor 321 and data line short-conductor 322 via the address line terminals 316 and data line terminals 317.

As described above, the address lines 312 of the address line group and data lines 313 of the data line group are connected respectively to the separated address line short-conductor 321 and data line short-conductor 322. Thus, the address lines 312 are connected to each other, and the data lines 313 are connected to each other. Both the address line short-conductor 321 and data line short-conductor 322 are located outside a cutting line 323 at which the peripheral portion of thee substrate is cut and removed in the process of fabricating the liquid crystal (LC) cell. The short-conductors 321 and 322 are cut and removed after the LC cell assembly is completed.

In the TFT array of the third embodiment, if an impulse voltage due to static electricity is applied to any one of the address line terminals 316, a charge energy injected through the address line short-conductor 321 is all dispersed and averaged in all address lines. Since the address line short-conductor 321 is independent from the data line short-conductor 322, a high voltage is not applied across the address and data lines 312 and 313.

Specifically, the address lines 312 are connected to the data lines 313 by parasitic capacitance at intersections of the address and data lines 312 and 313 or other portions. However, the data lines 313 are in the floating state, as viewed from the address lines 312. If the potential of the address lines varies with respect to the ground potential, the potential of the data lines similarly varies with respect to the ground potential. Therefore, a high voltage is not applied across the address and data lines. Accordingly, protection against sharp pulse-like voltage is ensured.

In addition, since the address line group and data line group are bundled, respectively, by the short-conductors, occurrence of short between the address lines 312 and data lines 313 can be detected by checking a given one of the address line terminals 316 and a given one of the data line terminals 317. Further, line breakage can be checked in the same manner with the prior art, and an inspection in an intermediate step, which is not possible in the prior art, can be partly performed.

Furthermore, the address line short-conductor 321 and data line short-conductor 322 are formed only on the two sides (left side and upper side) of the insulative transparent substrate 311, only an L-shaped portion 311A of the two sides of the substrate 311 may be cut and removed after the LC cell assembly is completed, and the non-used portion of the substrate can be reduced.

Modifications of the third embodiment will now be described in detail with reference to the accompanying drawings.

Figure 19:
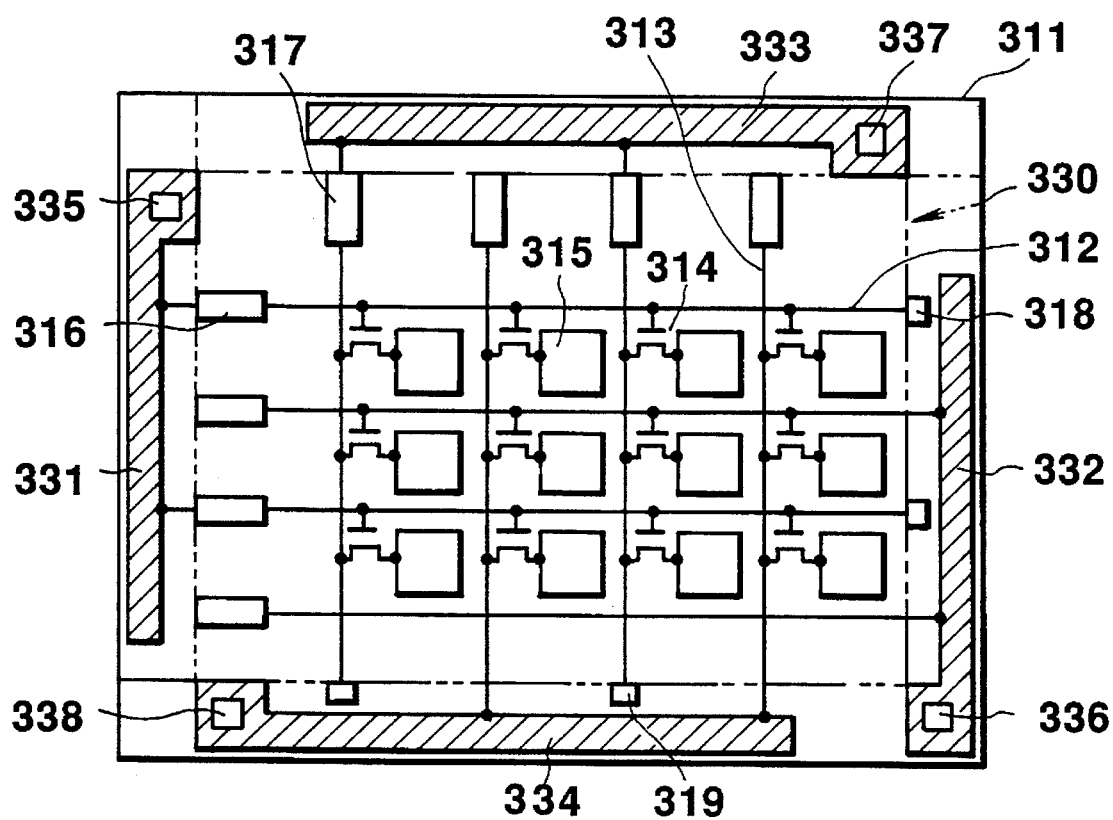
FIG. 19 is a plan view showing a first modification of the TFT array according to the third embodiment.

FIG. 19 is a plan view showing schematically the structure of the TFT array according to a first modification of the third embodiment. In the TFT array shown in FIG. 19, like the TFT array in FIG. 18, a display region is formed. Address line terminals 316, data line terminals 317, address line sub-terminals 318 and data line sub-terminals 319 are arranged outside the display region.

A first address line short-conductor 331 and a second address line short-conductor 332 for shorting only the group of address lines are formed on those portions of an insulative transparent substrate 311, which are near opposed two side edges. The address lines 312 are alternately connected to the first address line short-conductor 331 and second address line short-conductor 332.

Similarly, a data line short-conductor 333 and a second data line short-conductor 334 for shorting only the group of data lines are formed on those portions of the insulative transparent substrate 311, which are near the other opposed two side edges. The data lines 313 are alternately connected to the first data line short-conductor 333 and second data line short-conductor 334.

In this way, the address lines and data lines, respectively, are electrically connected by independent short-conductors. The first and second address line short-conductors 331 and 332 and first and second data line short-conductors 333 and 334 are cut along the line 330 and removed after the LC cell assembly is completed.

Furthermore, a test pad 335 is formed on the first address line short-conductor 331, a test pad 336 on the second address line short-conductor 332, a test pad 337 on the first data line short-conductor 333, and a test pad 338 on the second data line short-conductor 334.

In this modification, like the third embodiment, the address line group is electrically separated from the data line group, and therefore protection against sharp impulse of static electricity is ensured and a defect inspection can be performed.

Besides, by checking the conduction between the two short-conductors, a short between the address lines 312 or between the data lines 313 can be detected. In other words, by checking the conduction between the test pad 335 of the first address line short-conductor 331 and the test pad 336 of the second address line short-conductor 332, a short between the adjacent address lines 312 can be detected. Similarly, by checking the conduction between the test pad 337 of the first data line short-conductor 333 and the test pad 338 of the second data line short-conductor 334, a short between the adjacent data lines can be detected.

A second modification of the invention will now be described with reference to the accompanying drawings.

Figure 20:
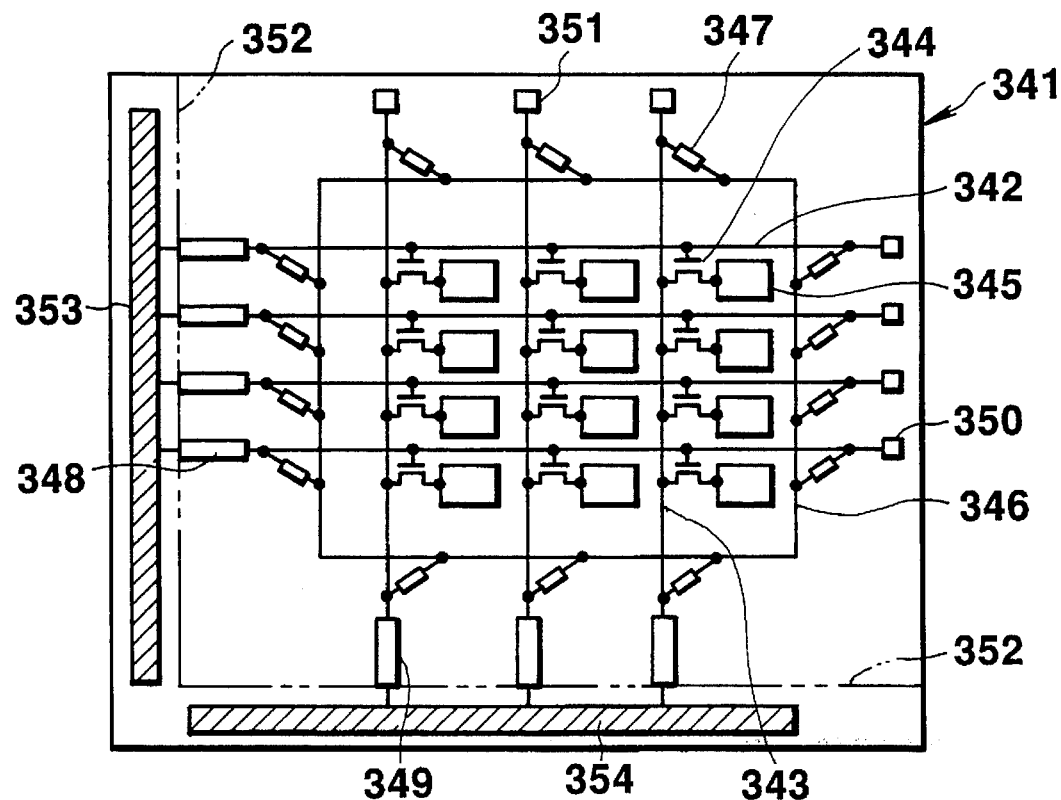
FIG. 20 is a plan view showing a second modification of the TFT array according to the third embodiment.

In FIG. 20, address lines 342 and data lines 343 are arranged on an insulative transparent substrate 341 such that the address lines 342 intersect the data lines 343. TFTs 344 and pixel electrodes 345 connected to either the source electrodes or drain electrodes of the TFTs 344 are arranged in a matrix at the intersections of the address and data lines 342 and 343. The gate electrodes of the TFTs 344 are connected to the address lines 342, and the source electrodes or drain electrodes of the TFTs 344, which are not connected to the pixel electrodes 345, are connected to the data lines 343. Short-wiring 346 is formed on a portion of the TFT array, which is located outside the display region. High-resistance elements, the aforementioned SCLC elements, or protection elements 347 with non-linear resistance characteristics are connected between the short-wiring 346 and the address lines 342 and between the short-wiring 346 and the data lines 343. Address line terminals 348, address line sub-terminals 350, data line terminals 349 and data line sub-terminals 351 are arranged on the outside of the protection elements 347. An address line short-conductor 353 connected to the address line terminals 348 is provided on the outside of a cutting line 352 of the insulative transparent substrate 341, and similarly a data line short-conductor 354 connected to the data line terminals 349 is provided on the outside of the cutting line 352 of the substrate 341.

The address line short-conductor 353 and data line short-conductor 354 are cut along the cutting line 352 and removed, after the LC cell assembly process is completed.

In this embodiment, the address line short-conductor 353 and data line short-conductor 354 are separated from each other. Therefore, the same advantages as in the third embodiment can be obtained.

Until the completion of the LC cell assembly process, protection against static electricity is ensured by the address line short-conductor 353 and data line short-conductor 354. After the substrate 341 is cut along the line 352, following the completion of the LC cell assembly process, protection against static electricity is ensured by the short-wiring 346, as in the first and second embodiments.

[Fourth Embodiment]

A fourth embodiment of the invention will now be described in detail with reference to FIGS. 21 to 28.

Figure 21:
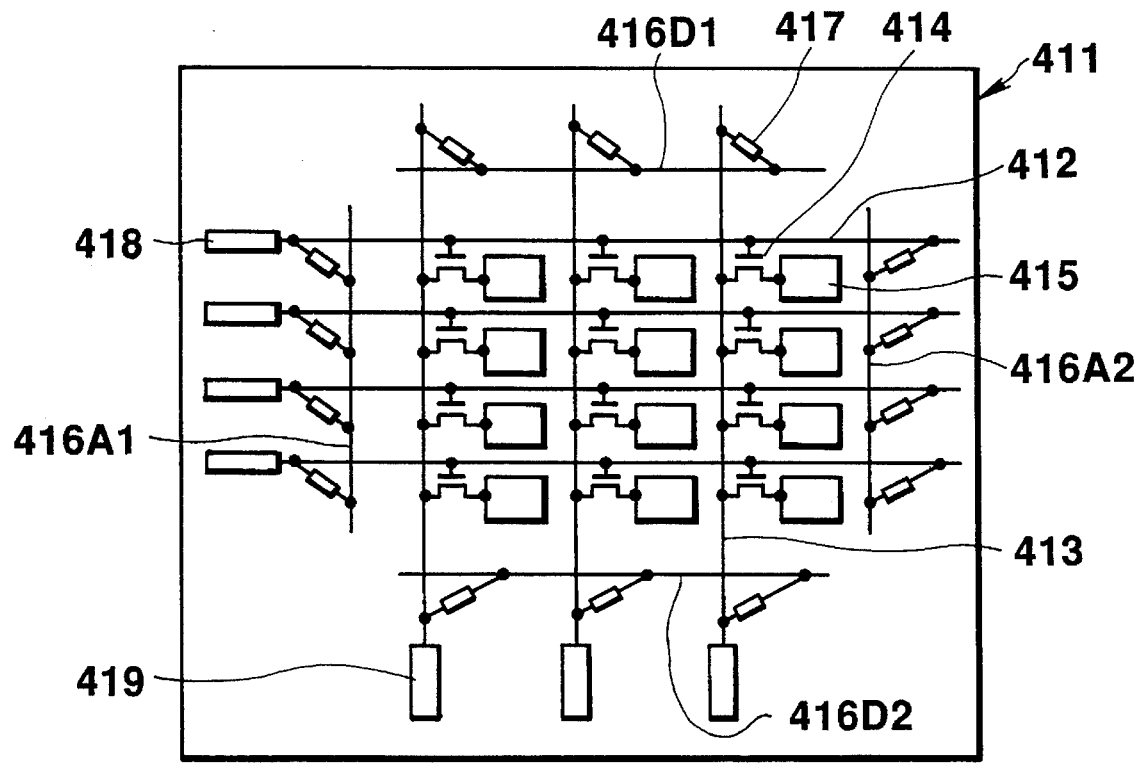
FIG. 21 is a plan view showing a TFT array according to a fourth embodiment of the invention.

FIG. 21 is a plan view showing schematically the structure of a TFT array according to the fourth embodiment of the invention. In FIG. 21, address lines 412 extending in rows and data lines 413 extending in columns are arranged on an insulative transparent substrate 411 such that the address lines 412 intersect the data lines 413 in an insulated manner. TFTs 414 connected to the address and data lines 412 and 413 are arranged at intersections of these lines 412 and 413, and also pixel electrodes 415 connected to the TFTs 414 are arranged at intersections of the address and data lines 412 and 413. These pixel electrodes 415 are arranged in a matrix to form a display region.

On the right and left sides of the insulative transparent substrate 411, there are provided first short-conductors 416A1 and 416A2 for connecting only the address lines 412 via protection elements 417 having high-resistance or non-linear resistance characteristics so that the address lines 412 may have a common potential. On the upper and lower sides of the substrate 411, there are provided second short-conductors 416D1 and 416D2 for connecting only the data lines 413 via protection elements 417 having high-resistance or non-linear resistance characteristics so that the data lines 413 may have a common potential. Reference numeral 418 denotes connection terminals of the address lines 412, and numeral 419 denotes connection terminals of thee data lines 413.

Figure 22:
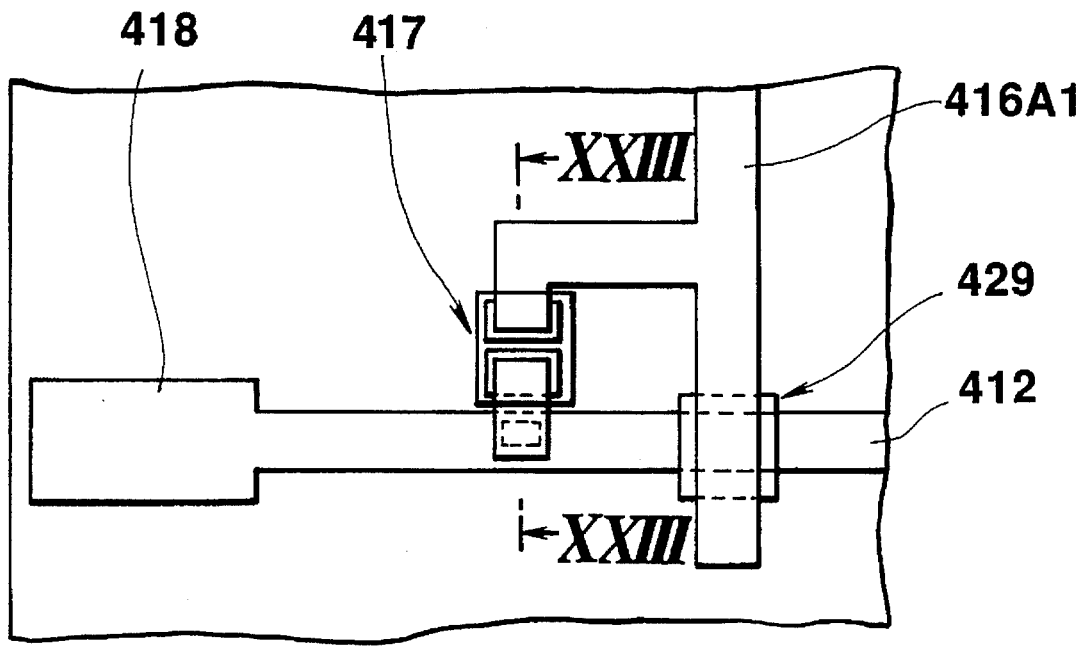
FIG. 22 is an enlarged plan view of a two-terminal device portion of the TFT array shown in FIG. 21.
Figure 23:
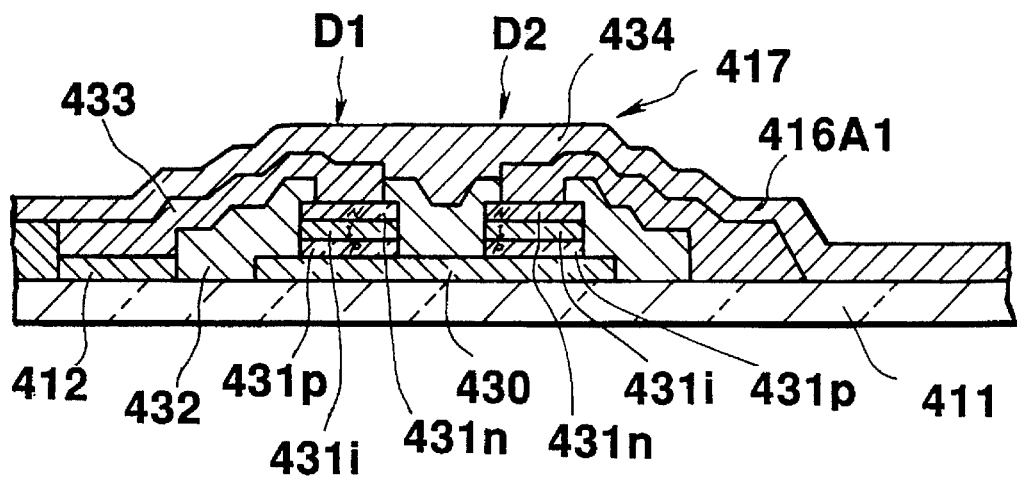
FIG. 23 is a cross-sectional view of the two-terminal device portion taken along line XXIII—XXIII in FIG. 21.

As the protection elements, the SCLC elements used in the first and second embodiments are employed. Alternatively, two-terminal elements which make use of diode characteristics as shown in FIGS. 22 and 23 may be used as protection elements. FIGS. 22 and 23 show, by way of example, the connection between the address lines 412 and short-conductors 416A1.

Specifically, an island-shaped base electrode 430 is formed on the insulative transparent substrate 411. Diodes D1 and D2 are formed on the base electrode 430 such that the diodes D1 and D2 face the base electrode 430. A p-type semiconductor layer 431p, an i-type layer 431i and an n-type semiconductor layer 431n are deposited in this order on the base electrode 430. Then, these layers are covered with an insulating film 432. The insulating film 432 is subjected to photolithoetching to form a contact. The n-type semiconductor layer 431n of the diode D1 is connected to the address line 412 by a connection conductor 433, and the n-type semiconductor layer 431n of the diode D2 is connected to the first short-conductor 416A1. The surface of the resultant structure is coated with a protection film 434.

Reference numeral 429 denotes an intersection insulating film for insulating an intersection between the address line 412 and the first short-conductor 416A1.

With the above structure, if an impulse voltage due to static electricity is applied to any one of the address lines 412, the protection element 417 connected to the short-conductor 416A1 or 416A2 of the address lines 412 is turned on, and injected charge energy is dispersed and averaged in all address lines 12.

The address lines 412 are connected to the data lines 413 by parasitic capacitance at intersections of the address and data lines 412 and 413 or other portions. However, the data lines 413 are in the floating state, as viewed from the address lines 412. If the potential of the address lines 412 varies with respect to the ground potential, the potential of the data lines 413 similarly varies with respect to the ground potential. Therefore, a high voltage is not applied across the address and data lines 412 and 413. Accordingly, protection against sharp pulse-like voltage is ensured.

Since the address lines 412 and data lines 413 are separated from each other with respect to DC, a leak current flowing between the address line 412 and data line 413 via the protection element 117 decreases, a load on the driving circuit decreases, and power consumption does not increase unnecessarily.

Modifications of the fourth embodiment will now be described.

Figure 24:
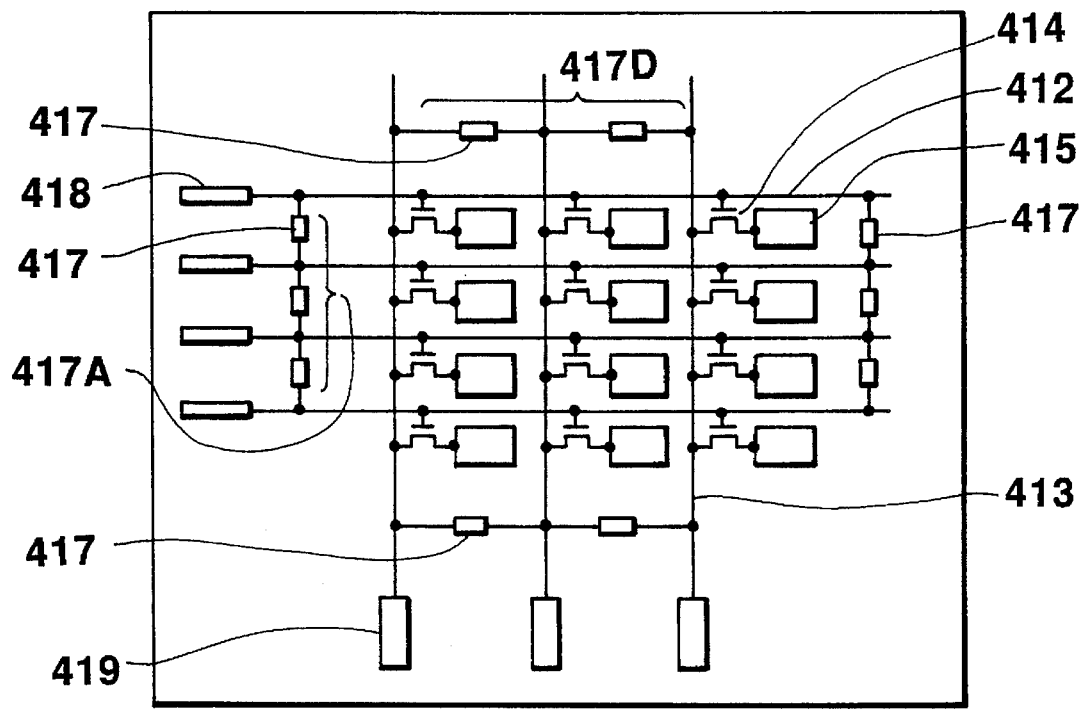
FIG. 24 is a plan view showing a first modification of the TFT array according to the fourth embodiment.

FIG. 24 is a plan view showing schematically the structure of a TFT array according to a first modification of the fourth embodiment. The TFT array comprises protection elements 417 having high-resistance or non-linear resistance characteristics for connecting adjacent ones of the address lines 412 and data lines 413. The protection elements 417 are provided with a first bridging portion 417A for connecting both ends of the protection elements 417 to adjacent address lines 412 and a second bridging portion 417D for connecting both ends of the protection elements 417 to adjacent data lines 413.

In this modification, unlike the fourth embodiment, the short-conductors are not used. The adjacent address lines 412 and adjacent data lines 413 are directly connected to the protection elements 417 so that a high potential due to application of sharp impulse-like static electricity is prevented from being applied across the address lines 412 or data lines 413.

According to this modification, the same advantages as in the fourth embodiment can be obtained, and the circuit configuration can be simplified. In addition, since there is no need to provide short-conductors crossing address lines or data lines, a defect of a short, etc. due to pin hole does not occur between these elements, and the manufacturing yield increases.

A second modification of the fourth embodiment will now be described.

Figure 25:
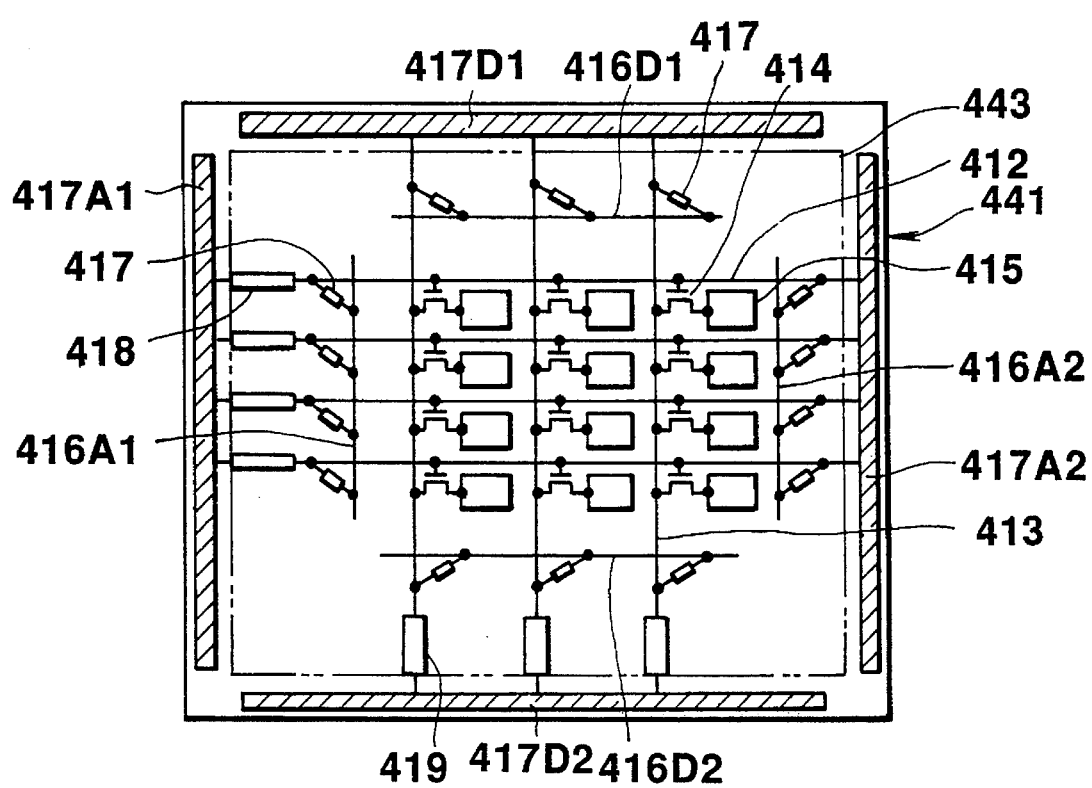
FIG. 25 is a plan view showing a second modification of the TFT array according to the fourth embodiment.

FIG. 25 is a plan view showing schematically the structure of the TFT array according to the second modification of the fourth embodiment. Like the structure shown in FIG. 21, a display region is formed, and on the right and left sides of the insulative transparent substrate 411, there are provided first short-conductors 416A1 and 416A2 for connecting only the address lines 412 via protection elements 417 having high-resistance or non-linear resistance characteristics. On the upper and lower sides of the substrate 411, there are provided second short-conductors 416D1 and 416D2 for connecting only the data lines 413 via protection elements 417 having high-resistance or non-linear resistance characteristics.

First short-wiring 417A1 and 417A2 for shorting only the address lines 412 is formed outside the first short-conductors 416A1 and 416A2 and outside the cutting line 443 for cutting and removing the peripheral portion of the substrate in the process of fabricating the display device. Second short-wiring 417D1 and 417D2 for shorting only the data lines 414 is formed outside the second short-conductors 416D1 and 416D2 and outside the cutting line 443.

According to the second modification, the data lines and address lines are respectively shorted until the completion of the step for cutting and removing the first and second short-wirings. Thereafter, these lines are shorted by the protection elements. Therefore, protection against static electricity is more ensured.

A third modification of the fourth embodiment will now be described.

Figure 26:
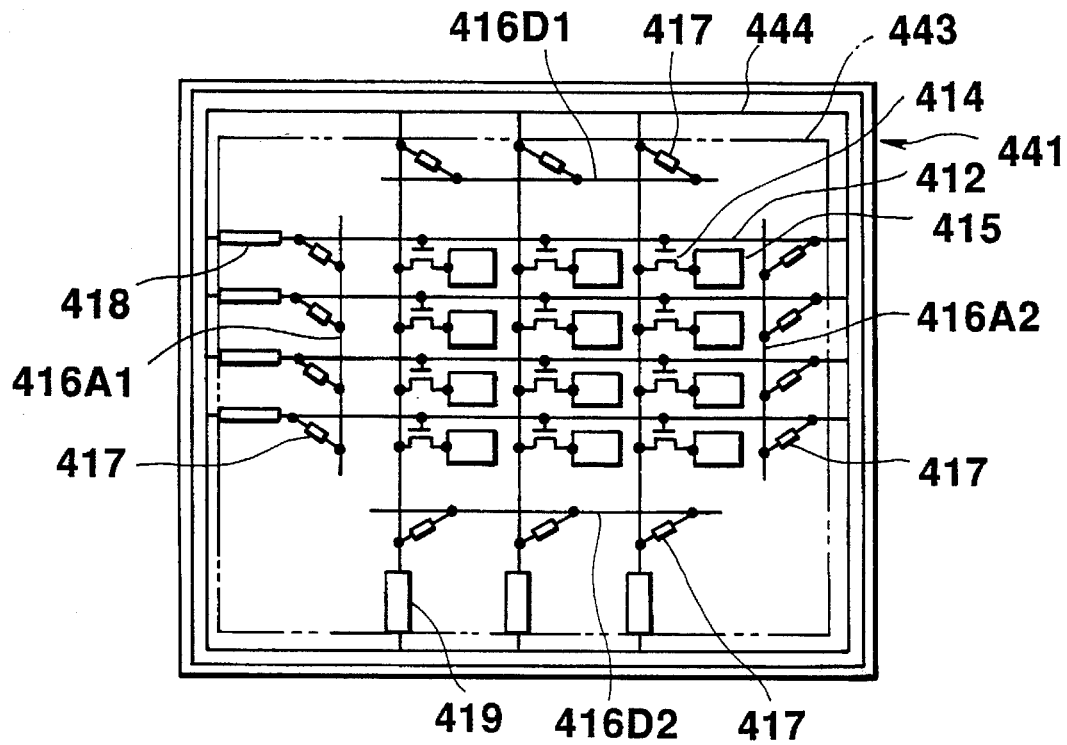
FIG. 26 is a plan view showing a third modification of the TFT array according to the fourth embodiment.

FIG. 26 is a plan view showing schematically the structure of a TFT array according to the third modification. Like the structure shown in FIG. 21, a display region is formed, and on the right and left sides of the insulative transparent substrate 411, there are provided first short-conductors 416A1 and 416A2 for connecting only the address lines 412 via protection elements 417 having high-resistance or non-linear resistance characteristics. On the upper and lower sides of the substrate 411, there are provided second short-conductors 416D1 and 416D2 for connecting only the data lines 413 via protection elements 417 having high-resistance or non-linear resistance characteristics.

Short-wiring 444 for shorting the address lines 412 and data lines 413 are formed outside first short-conductors 416A1 and 416A2 and second short-conductors 416D1 and 416D2 and outside the cutting line 443.

According to the third modification, protection effect against DC-like static electricity is obtained until the completion of the step for cutting and removing the short-wiring. Thereafter, protection effect against AC-like static electricity is obtained.

A fifth modification of the fourth embodiment will now be described.

Figure 27:
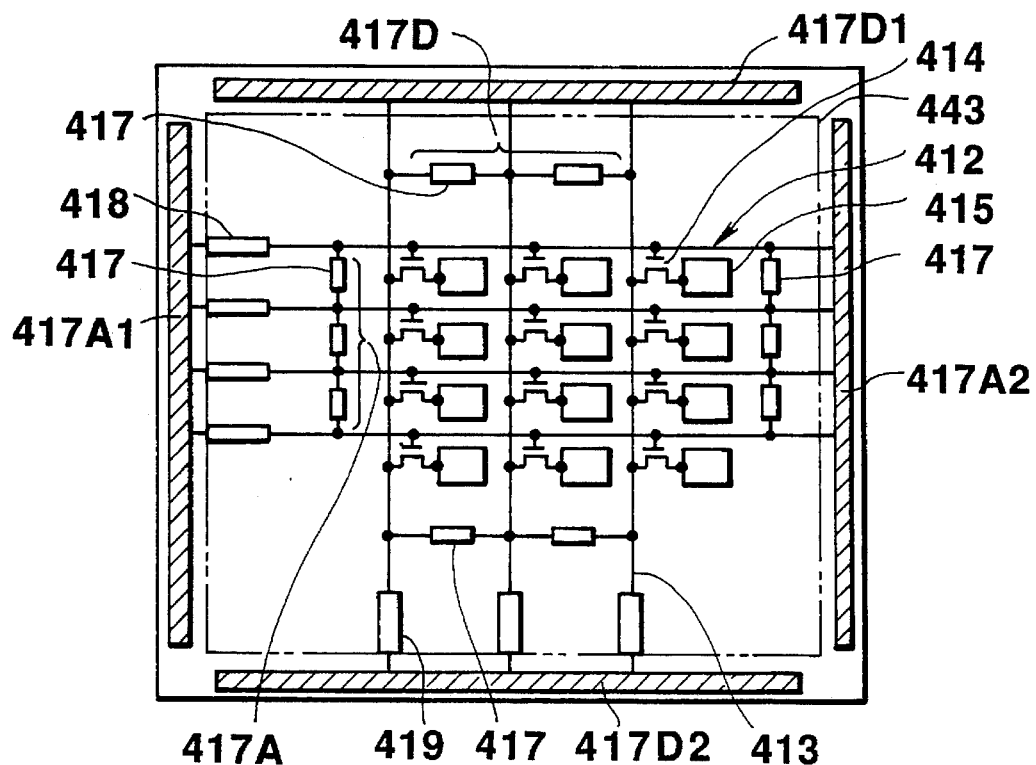
FIG. 27 is a plan view showing a fourth modification of the TFT array according to the fourth embodiment.
Figure 28:
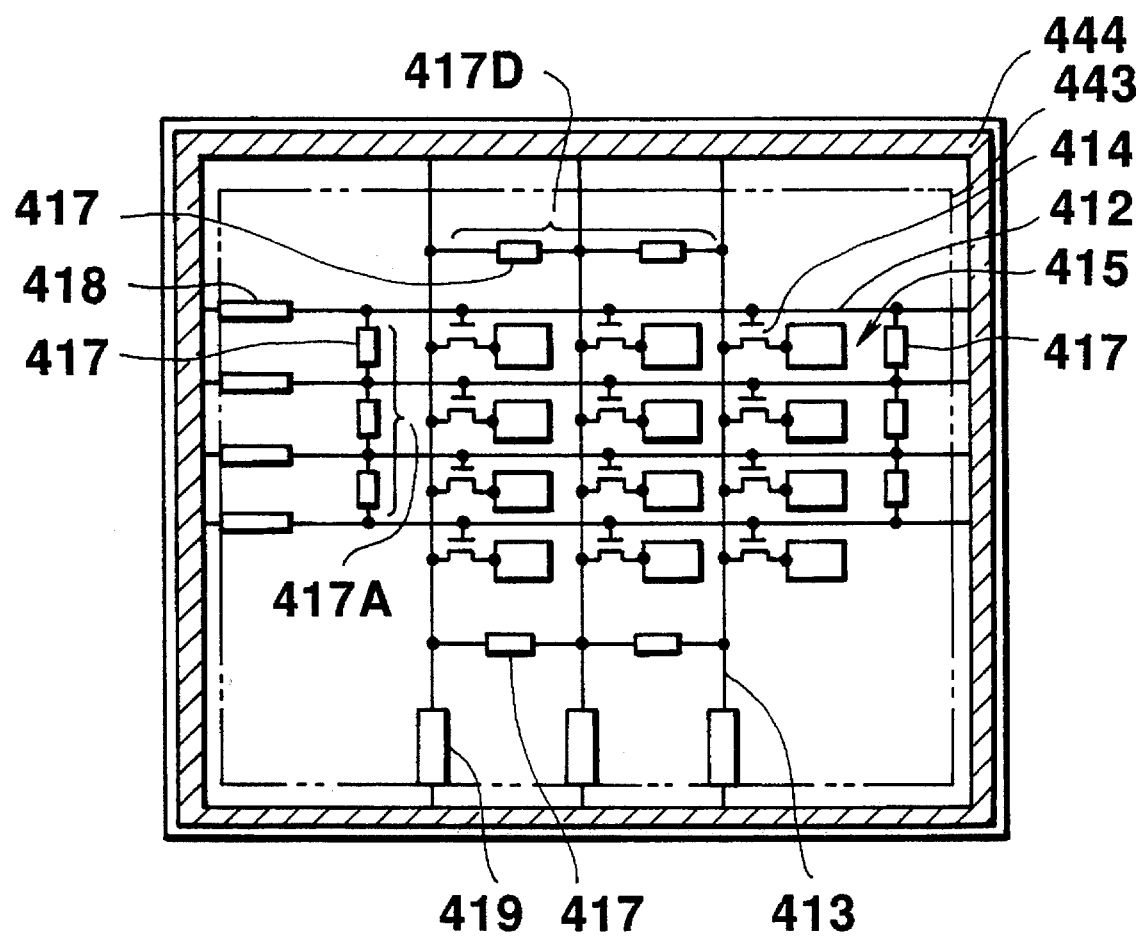
FIG. 28 is a plan view showing a fifth modification of the TFT array according to the fourth embodiment.

FIG. 27 is a plan view showing schematically the structure of a TFT array according to the fourth modification. Like the fourth embodiment, a display region is formed. This TFT has protection elements 417 with high-resistance or non-linear resistance characteristics for connecting the address line group and the data line group, respectively. The protection elements 417 are provided with first bridging portions 417A connected to adjacent ones of the address lines 412 and second bridging portions 417D connected to adjacent ones of the data lines 413.

Furthermore, first short-wirings 417A1 and 417A2 for shorting only the group of address lines 412 and second short-wirings 417D1 and 417D2 for shorting only the data lines 413 are formed outside the first bridging portions 417A and second bridging portions 417D and outside the cutting line 443.

According to the fourth modification, the advantages of both the first and second modifications can be obtained, protection against static electricity is ensured, and the manufacture is easy.

A fifth modification of the fourth embodiment will now be described.

Like the fourth modification, the display region, the first bridging portions 417A and the second bridging portions 417D are formed, and short-wiring 444 is formed on the outside of the cutting line 443. According to the fifth modification, the same advantages as in the first and third modifications can be obtained, protection against static electricity is ensured, and the manufacture is easy.

[Fifth Embodiment]

The active matrix LCD device fabricated by using the TFT array having the protection elements as disclosed in the first to fourth embodiments is driven by applying address signals to the address lines for successively varied selection time periods, applying to the data lines data signals corresponding to display data, and applying a common signal to the opposed electrode of the opposed substrate.

The LCD device is driven by a method in which a predetermined potential is applied to the short-wiring of the TFT array to reduce power consumption.

A fifth embodiment of the present invention, which relates to a driving method, will now be described in detail with reference to FIGS. 29 to 31.

The LCD device is constructed as follows.

Figure 29:
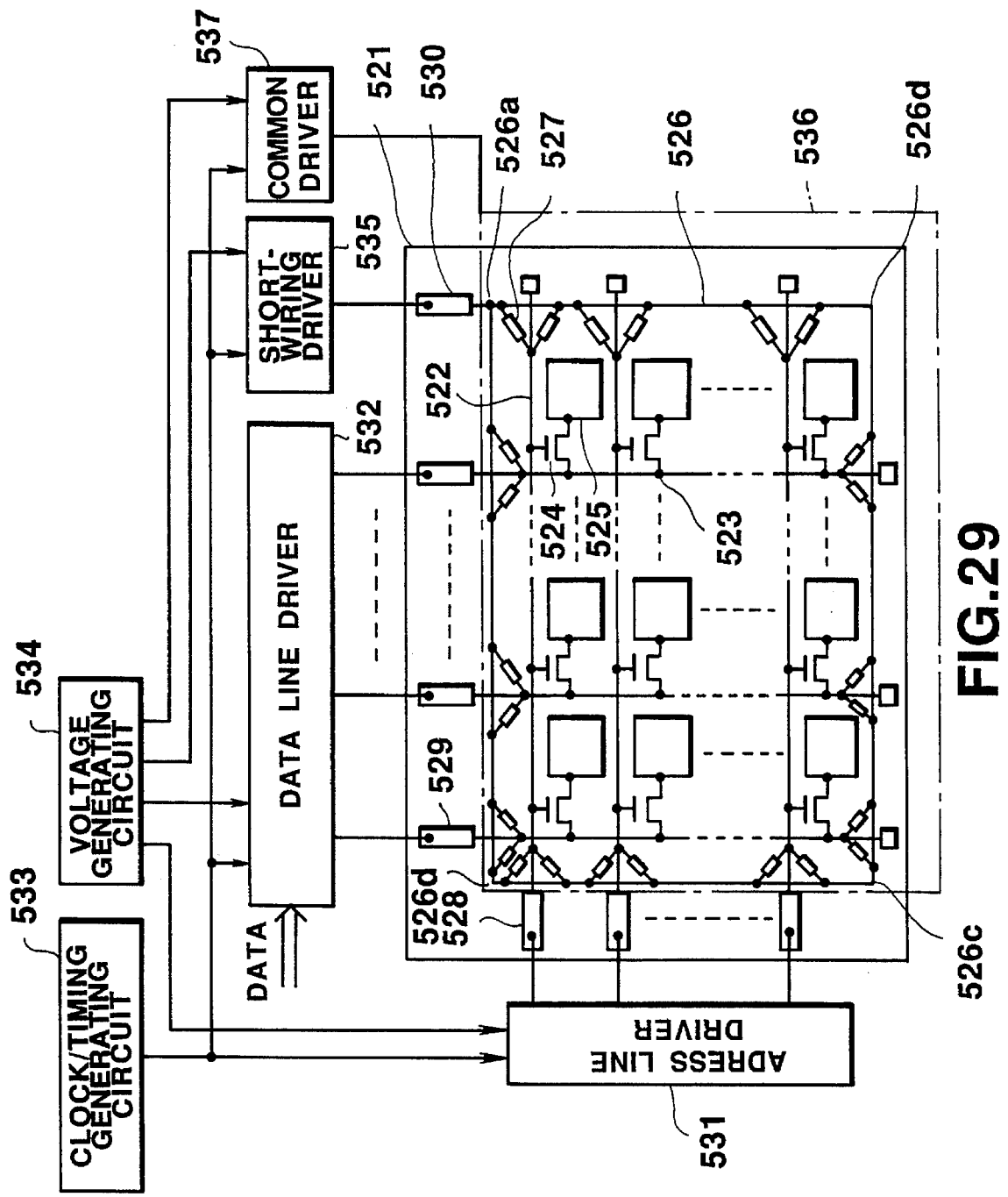
FIG. 29 schematically shows the structure of an LCD apparatus according to a fifth embodiment of the invention.

In FIG. 29, address lines 522 and data lines 523 are arranged on an insulative transparent substrate 521 made of a glass substrate, etc. such that the address lines 522 intersect the data lines 523. TFTs 524 are arranged at intersections of the address and data lines 522 and 523. Pixel electrodes 525 connected to the TFTs 524 are arranged in a matrix, and a display region is formed by the pixel electrodes. Short-wiring 526 is formed adjacent to an outer peripheral portion of the display region, so as to intersect the address lines 522 and data lines 523. At the intersections between the short-wiring 526 and data and address lines, protection elements 527 having bidirectional I-V characteristics and non-linear resistance characteristics are arranged so as to connect the short-wiring and address and data lines.

The address lines 522 are provided with connection terminals 528. The connection terminals 528 are connected to an address line driver 531 for generating address signals. The data lines 523 are provided with connection terminals 529, and the connection terminals 529 are connected to a data line driver 532 for generating data signals. Opposed electrodes 536 formed on an opposed substrate (not shown) is situated to face the pixel electrodes 525, and a common driver 537 for generating a common signal is connected to the opposed electrodes 536. A liquid crystal is sealed between the TFT array and the opposed substrate.

A clock/timing generating circuit 533 generates various sync signals, and the generated signals are supplied to the address line driver 531, data line driver 532 and common driver 537.

A voltage generating circuit 534 generates a voltage corresponding to each potential for producing address signals and data signals. The generated voltage is applied to the address line driver 531, data line driver 532 and common driver 537.

The short-wiring 526 is provided with a lead-out terminal 530 for applying a short-wiring voltage (hereafter referred to as "short-wiring compensation voltage"). The lead-out terminal 530 is connected to a short-wiring driver 535 which is supplied with a sync signal from the clock timing signal generating circuit and a power supply voltage from the power supply voltage. The short-wiring driver 535 generates a predetermined short-wiring compensation voltage and applies this voltage to the short-wiring 526 via the lead-out terminal 530. Although only one lead-out terminal 530 is provided at the upper right corner 526a of the short-wiring 526, two or more lead-out terminals 530 may be provided. In this case, lead-out terminals 530 may be provided at the upper left corner 526d, lower left corner 526c and lower right corner 526b of the short-wiring 526, in addition to the upper right corner 526a, and these lead-out terminals 530 are all connected to the short-wiring driver 535.

The lead-out terminal 530, like the short-wiring 526, is formed simultaneously with the formation of the gate electrode and address wiring 522 or the drain electrode and data wiring 523 made of aluminum, aluminum alloy, tantalum, tantalum alloy, chromium, etc.

One of the short-wiring compensation voltages (shown below) is applied to the short-wiring 526 via the lead-out terminal 530.

FIGS. 31A to 31D show various modes of short-wiring compensation potentials S1 to S4 (indicated by solid lines), along with address signals G (broken lines) and data signals D (dot-and-dash lines). The data signal has a voltage waveform which is inverted to the positive side or negative side with respect to the common signal potential applied to the opposed electrode 536 of the opposed substrate, with one frame defined as one cycle.

Figure 31A:
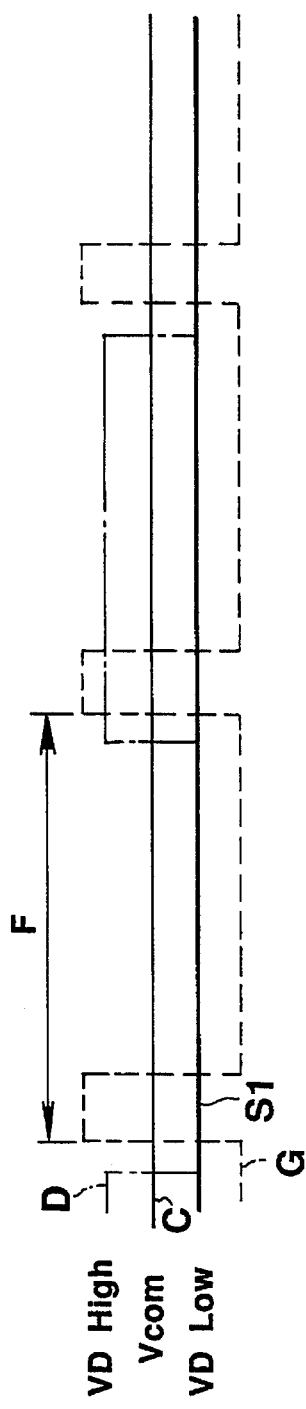
FIGS. 31A to 31D show voltage waveforms of signals applied to the connection terminals of the lines LCD apparatus according to the fifth embodiment.
Figure 31B:
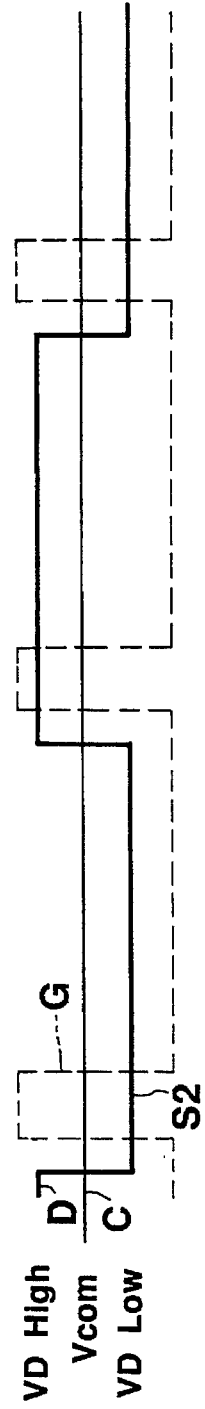
Figure 31C:
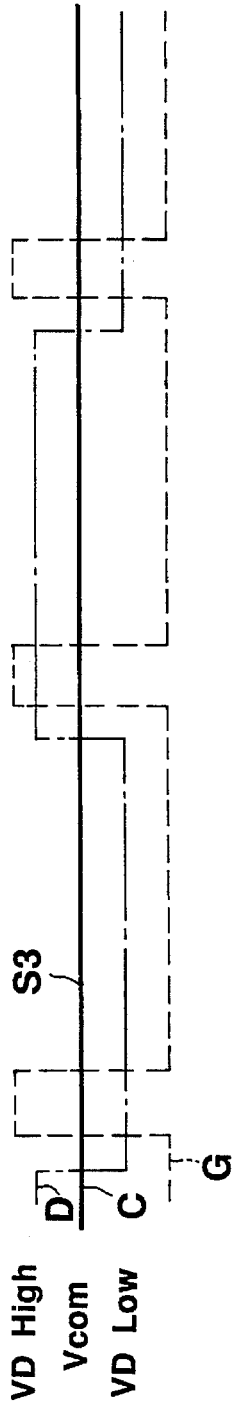
Figure 31D:
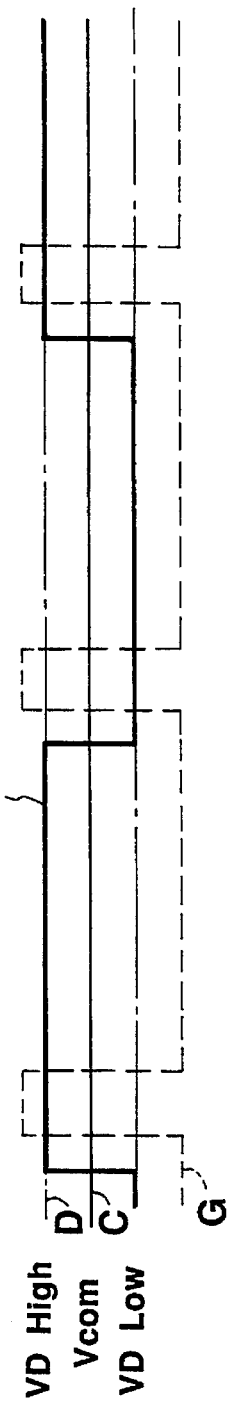
Figure 32:
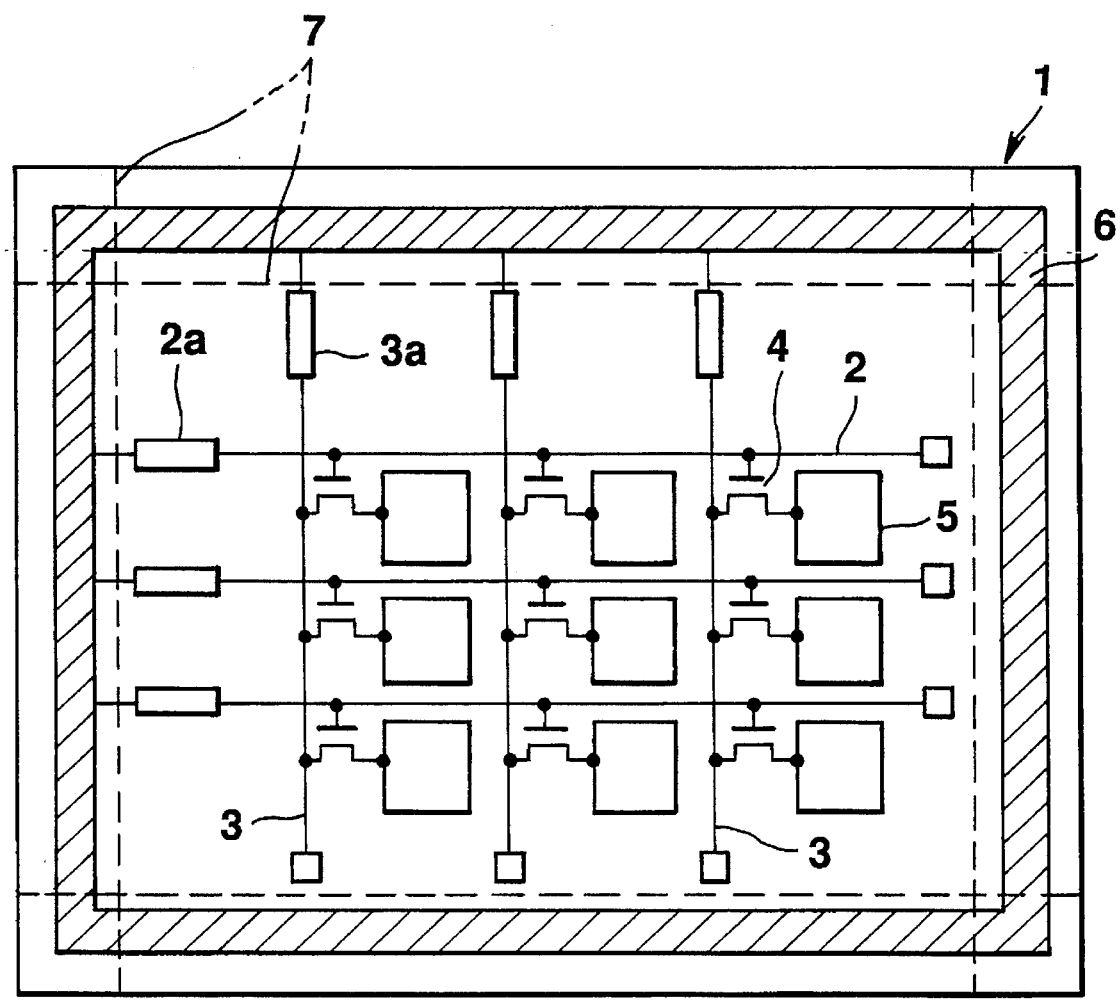
FIG. 32 is a plan view showing a conventional TFT array.
Figure 33:
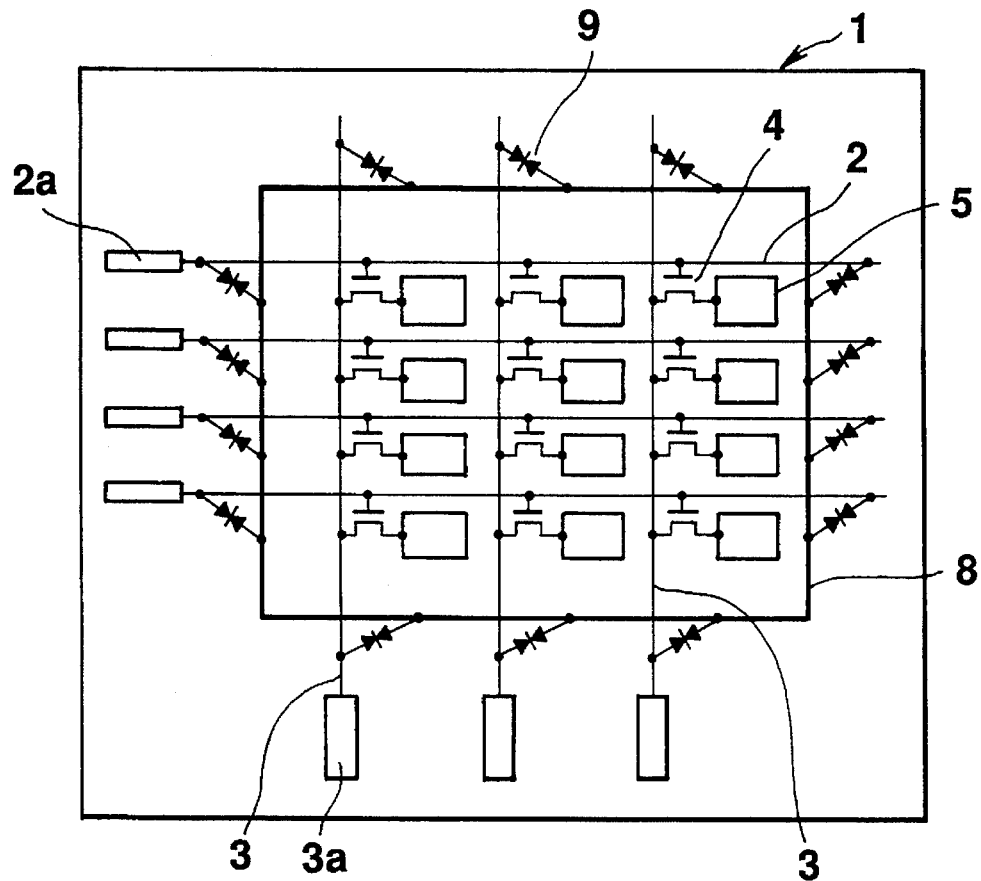
FIG. 33 is a plan view showing another conventional TFT array.
Figure 34:
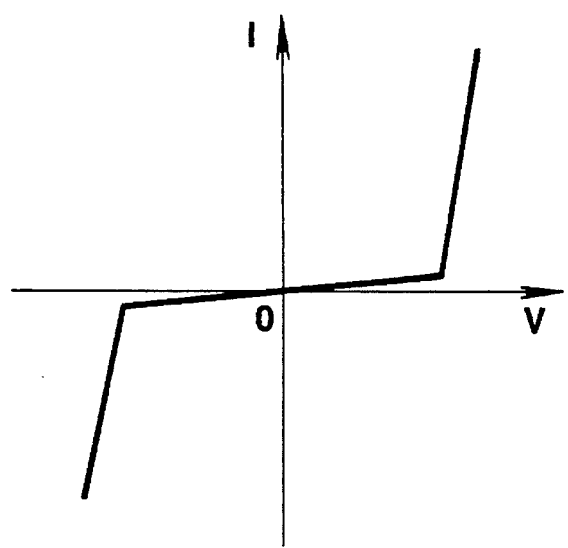
FIG. 34 is a graph showing V-I characteristics of the two-terminal device used in the TFT array shown in FIG. 33.

(1) Voltage S1 for keeping the short-wiring compensation voltage at a lowest potential Vd Low (e.g. 3.5 V) of the data signal (FIG. 31A);

(2) Voltage S2 for synchronizing the short-wiring compensation voltage with an inverted cycle of the data signal and varying this compensation voltage so as to coincide with the potential of the data signal (e.g. Low=3.5 V, High=13.5 V), i.e. voltage S2 for inverting the compensation voltage in synchronism with the inverted cycle of Vd (FIG. 31B);

(3) Voltage S3 for keeping the short-wiring compensation voltage at a potential Vcom (e.g. 8.5 V)d applied to the electrode of the opposed substrate (FIG. 31C); and (4) Voltage S4 for displacing the cycle of the short-wiring compensation voltage from the inverted cycle of the data signal by a half cycle and inverting the compensation voltage at the same potential as the data signal.

Figure 30:
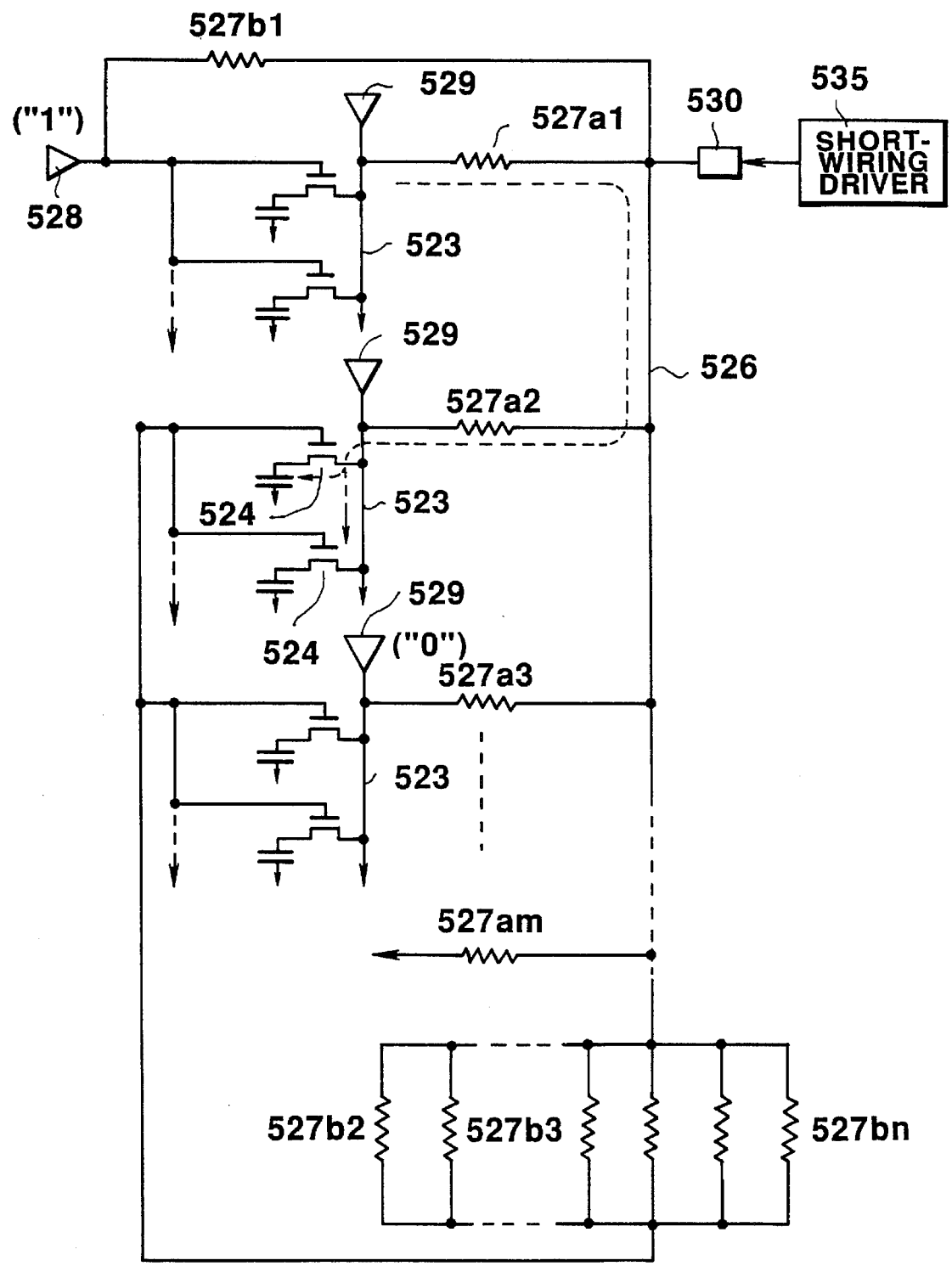
FIG. 30 shows an equivalent circuit of the LCD apparatus, as viewed from the connection terminal of one data line.

As has been described above, when a predetermined compensation voltage is applied to the lead-out terminal 530, the potential of the short-wiring is kept at a predetermined level, as is shown in FIG. 30 illustrating an equivalent circuit as viewed from one data line 523 of the TFT array. Thus, a potential difference between the data signal applied to the connection terminal 529 of the data line 523 and the short-wiring decreases. In addition, when the data signal and/or compensation voltage varies, an average of a potential difference therebetween decreases. Therefore, a leak current (indicated by a broken-line arrow) flowing from the connection terminal 529 of the data line 523 through the protection elements 527a1 and 527a2 decreases. Furthermore, a leak current flowing from the connection terminal 529 of the data line 523 through the protection element 527a1 and other protection elements 527b2 to 527bn decreases, and power consumption decreases.

Examples of power consumed by the drivers when one of the above-mentioned short-wiring compensation voltages S1 to S4 is applied to the short-wiring of the LCD device of the present invention will now be shown.

(1) In the case of voltage S1 which keeps the short-wiring compensation voltage at the lowest potential of the data signal, the total power consumption of each driver is 130 nW.

(2) In the case of voltage S2 which synchronizes the short-wiring compensation voltage with an inverted cycle of the data signal D and varies this compensation voltage so as to coincide with the potential of the data signal, the total power consumption of each driver is 350 nW.

(3) In the case of voltage S3 which keeps the short-wiring compensation voltage at a potential applied to the opposed electrode of the opposed substrate, the total power consumption of each driver is 365 nw.

(4) In the case of voltage S4 which displaces the cycle of the short-wiring compensation voltage from the inverted cycle of the data signal by a half cycle and inverts the compensation voltage at the same potential as the data signal, the total power consumption of each driver is 440 nw.

By contrast, in the case where the compensation voltage is not applied to the short-wiring, a large leak current flows from one connection terminal 529 of the data line 523 to the TFT 524 connected to the adjacent data line 523 through the protection element 527a1 connecting the data line 523 and short-wiring 526 and the protection element 527a2 connecting the adjacent data line 523 and short-wiring 526. In addition, since other protection elements 527b2 to 527bn connecting the address lines 522 and short-wiring 526 are grounded in parallel, the potential of the short-wiring 526 becomes substantially the ground potential. Thus, a large leak current flows from the connection terminal 529 of the data line 523 through the protection element 527a1 and other protection elements 527b2 to 527bn.

If the average voltage of the data signal D is 8.5 V and the voltage of the address signal G is 25 V, the entire consumed power is 535 nw.

As has been described above, according to the driving method of the present invention, crosstalk between pixels can be decreased and the power consumption can be reduced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A thin film transistor array comprising:

an insulative substrate;

a plurality of pixel electrodes arranged in a matrix above the insulative substrate, said pixel electrodes being arranged in a display region of the array;

a plurality of thin film transistors connected to the pixel electrodes, respectively;

a plurality of address lines formed on or above said insulative substrate and having connection terminals for connection with a driver circuit at a region outside the display region in which said pixel electrodes are arranged, each address line being connected to a plurality of control electrodes of said thin film transistors;

a plurality of data lines arranged on or above the insulative substrate in such a manner as to intersect with the address lines and having connection terminals for connection with a driving circuit at a region outside the display region in which said pixel electrodes are arranged, each data line being connected to a plurality of data input electrodes of said thin film transistors;

each of said thin film transistors comprising a gate electrode formed on said insulative substrate, said gate electrode serving as the control electrode, a gate insulating film covering the gate electrode, a first semiconductor film, a drain electrode formed on one side of the first semiconductor film via an ohmic contact layer and connected to a corresponding one of said data lines, said drain electrode serving as the data input electrode, and a source electrode formed on another side of the first semiconductor film via another ohmic contact layer and connected to a corresponding one of said pixel electrodes;

the gate insulating films of the thin film transistors comprising one common insulating film formed in substantially an entire display region of said insulative substrate;

at least one address line short-circuiting conductor in a region of the insulative substrate outside the display region in which said pixel electrodes are arranged, and connected to said address lines by respective thin film two-terminal elements, said two-terminal elements each having non-linear resistance characteristics; and at least one data line short-circuiting conductor, insulated from said at least one address line short-circuiting conductor, formed on a region of the insulative substrate outside the display region in which said pixel electrodes are arranged, and connected to said data lines by respective thin film two-terminal elements, said two-terminal elements each having non-linear resistance characteristics;

said at least one address line short-circuiting conductor and said at least one data line short-circuiting conductor being formed inside of a terminal arrangement section in which the connection terminals of the address lines and the data lines are arranged; and each of said two-terminal elements comprising:

a second semiconductor film which is formed on the common insulating film;

a first electrode formed on one side of the second semiconductor film and connected to one of said data and address lines;

a second electrode formed on another side of the second semiconductor film and connected to one of said short-circuiting conductors;

an ohmic contact layer between said first electrode and said second semiconductor film; and another ohmic contact layer between said second electrode and said second semiconductor film.

2. A liquid crystal display device comprising:

a first insulative substrate;

a plurality of pixel electrodes arranged in a matrix above the first insulative substrate;

a plurality of thin film transistors connected to the pixel electrodes, respectively;

a plurality of address lines formed on or above the first insulative substrate, each address line being connected to a plurality of control electrodes of said thin film transistors, said address lines being supplied with address signals for successively selecting the address lines;

a plurality of data lines arranged on or above the first insulative substrate so as to intersect the address lines, each data line being connected to a plurality of data input electrodes of said thin film transistors, said data lines being supplied with data signals corresponding to display data to be displayed and having a potential waveform inverted at predetermined cycles;

at least one short-circuiting wire formed on or above the first insulative substrate and outside of a display region in which the pixel electrodes are arranged, wherein at least two lines of said plurality of address lines and at least two lines of said plurality of data lines are connected to said at least one short-circuiting wire by respective two-terminal elements, said two-terminal elements each having non-linear resistance characteristics;

a short-wiring driver, connected to said at least one short-circuiting wire, for applying a predetermined potential to said at least one short-circuiting wire;

a second insulative substrate opposed to a surface of said first insulative substrate, said second insulative substrate having a surface provided with at least one opposed electrode opposed to said pixel electrodes; and a liquid crystal layer of a predetermined thickness interposed between said first and second insulative substrates;

wherein said short-wiring driver supplies to said at least one short-circuiting wire a potential which is synchronized with an inverted cycle of said data signals supplied to the data lines and is inverted with the same potential and same phase as the data signals with reference to a potential applied to the at least one opposed electrode formed on the second substrate.

3. A liquid crystal display device comprising:

a first insulative substrate;

a plurality of pixel electrodes arranged in a matrix above the first insulative substrate;

a plurality of thin film transistors connected to the pixel electrodes, respectively;

a plurality of address lines formed on or above the first insulative substrate, each address line being connected to a plurality of control electrodes of said thin film transistors, said address lines being supplied with address signals for successively selecting the address lines;

a plurality of data lines arranged on or above the first insulative substrate so as to intersect the address lines, each data line being connected to a plurality of data input electrodes of said thin film transistors, said data lines being supplied with data signals corresponding to display data to be displayed and having a potential waveform inverted at predetermined cycles;

at least one short-circuiting wire formed on or above the first insulative substrate and outside of a display region in which the pixel electrodes are arranged, wherein at least two address lines of said plurality of address lines and at least two data lines of said plurality of data lines are connected to said at least one short-circuiting wire by respective two-terminal elements, said two-terminal elements each having non-linear resistance characteristics;

a short-wiring driver, connected to said at least one short-circuiting wire, for applying a predetermined potential to said at least one short-circuiting wire;

a second insulative substrate opposed to a surface of said first insulative substrate, said second insulative substrate having a surface provided with at least one opposed electrode opposed to said pixel electrodes; and a liquid crystal layer of a predetermined thickness interposed between said first and second insulative substrates;

wherein said short-wiring driver supplies to said at least one short-circuiting wire a potential which is synchronized with said data signals supplied to the data lines and is inverted with the same potential and opposite phase as the data signals, with reference to a potential applied to the at least one opposed electrode formed on the second substrate.

4. A thin film transistor array comprising:

an insulative substrate;

a plurality of pixel electrodes arranged in a matrix above the insulative substrate, said pixel electrodes being arranged in a display region of the array;

a plurality of thin film transistors connected to the pixel electrodes, respectively;

a plurality of address lines formed on or above said insulative substrate and having connection terminals for connection with a driver circuit at a region outside the display region in which said pixel electrodes are arranged, each address line being connected to a plurality of control electrodes of said thin film transistors;

a plurality of data lines arranged on or above the insulative substrate in such a manner as to intersect with the address lines and having connection terminals for connection with a driving circuit at a region outside the display region in which said pixel electrodes are arranged, each data line being connected to a plurality of data input electrodes of said thin film transistors;

at least one address line short-circuiting conductor in a region of the insulative substrate outside the display region in which said pixel electrodes are arranged, and connected to only said address lines; and at least one data line short-circuiting conductor, insulated from said address line short-circuiting conductor, formed on a region of the insulative substrate outside the display region in which said pixel electrodes are arranged, and connected to only said data lines; and wherein:

said at least one address line short-circuiting conductor and said at least one data line short-circuiting conductor are formed inside of a terminal arrangement section in which the connection terminals of the address lines and the data lines are arranged; and said address lines and said data lines are connected to said at least one address line short-circuiting conductor and to said at least one data line short-circuiting conductor by respective thin film two-terminal elements having non-linear resistance characteristics.

5. A thin film transistor array according to claim 4, wherein:

said at least one address line short-circuiting conductor comprises two first short-circuiting wirings formed along opposed edges of said display region;

at least two of said address lines are connected to each of the first short-circuiting wirings;

said at least one data line short-circuiting conductor comprises two second short-circuiting wirings formed along opposed edges of said display region; and at least two of said data lines are connected to each of the second short-circuiting wirings.

6. A thin film transistor array comprising:

a plurality of pixel electrodes arranged in a matrix above the insulative substrate, said pixel electrodes being arranged in a display region of the array;

a plurality of thin film transistors connected to the pixel electrodes, respectively;

a plurality of address lines formed on or above said insulative substrate and having connection terminals for connection with a driver circuit at a region outside the display region in which said pixel electrodes are arranged, each address line being connected to a plurality of control electrodes of said thin film transistors;

a plurality of data lines arranged on or above the insulative substrate in such a manner as to intersect with the address lines and having connection terminals for connection with a driving circuit at a region outside the display region in which said pixel electrodes are arranged, each data line being connected to a plurality of data input electrodes of said thin film transistors;

at least one address line short-circuiting conductor in a region of the insulative substrate outside the display region in which said pixel electrodes are arranged, and connected to only said address lines; and at least one data line short-circuiting conductor, insulated from said address line short-circuiting conductor, formed on a region of the insulative substrate outside the display region in which said pixel electrodes are arranged, and connected to only said data lines; and wherein:

said at least one address line short-circuiting conductor and said at least one data line short-circuiting conductor comprise:

first short-circuiting wirings formed inside of a terminal arrangement section in which the connection terminals of the address lines and the data lines are arranged, wherein said address lines and said data lines are connected to said first short-circuiting wirings by respective thin film two-terminal elements having non-linear resistance characteristics; and second short-circuiting wirings formed outside of the terminal arrangement section, wherein said address lines and said data lines are connected to said second short-circuiting wirings.

7. A thin film transistor array according to claim 4, wherein said thin film two-terminal elements each include:

a double-injection type thin film non-linear resistor element in which holes and electrons are injected as carriers, said double-injection type thin film non-linear resistor element comprising a semiconductor film of a non-doped hydrogenated amorphous silicon film formed on or above the insulative substrate, said semiconductor film having two ends;

a first electrode formed on one end of said semiconductor film and connected to one of said data and address lines; and a second electrode formed on another end of said semiconductor film and connected to one of said short-circuiting conductors.

8. A thin film transistor array according to claim 4, wherein said thin film two-terminal elements each include:

a thin film non-linear resistor element in which electrons are injected as a carrier, said thin film non-linear resistor element comprising a semiconductor film of a non-doped hydrogenated amorphous silicon film formed on or above the insulative substrate, said semiconductor film having two ends;

two n-type amorphous silicon films doped with n-type impurities and respectively formed at both ends of said semiconductor film;

a first electrode formed on one of said n-type amorphous silicon films and connected to one of said data and address lines; and a second electrode formed on the other of said n-type amorphous silicon films and connected to one of said short-circuiting conductors.

* * * * *

UNITED STATES PATENT AND TRADEMARK OFFICE
CERTIFICATE OF CORRECTION

PATENT NO. : 5,504,348
DATED : April 2, 1996
INVENTOR(S) : Yoshida et al.

It is certified that error appears in the above-indentified patent and that said Letters Patent is hereby corrected as shown below:

Title page, item [54] and col. 1, lines 1-3, change title:

"THIN-FILM TRANSISTOR ARRAY AND LIQUID CRYSTAL DISPLAY DEVICE USING THE THIN-FILM TRANSISTOR ARRAY"

to

--THIN-FILM TRANSISTOR ARRAY PROTECTED FROM STATIC ELECTRICITY--.

Signed and Sealed this

Third Day of December, 1996

Attest:

BRUCE LEHMAN

*Attesting Officer*  *Commissioner of Patents and Trademarks*